(12) United States Patent
Iwasaki et al.

(10) Patent No.: US 10,990,712 B2
(45) Date of Patent: Apr. 27, 2021

(54) CONTACT FORCE EVALUATION METHOD

(71) Applicant: MITSUBISHI HEAVY INDUSTRIES, LTD., Tokyo (JP)

(72) Inventors: Makoto Iwasaki, Tokyo (JP); Kazuo Hirota, Tokyo (JP); Shingo Nishida, Tokyo (JP); Tetsuya Arikawa, Tokyo (JP); Ryoichi Kawakami, Tokyo (JP); Masaaki Katayama, Tokyo (JP); Toshifumi Nariai, Tokyo (JP); Kohei Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 331 days.

(21) Appl. No.: 16/067,666

(22) PCT Filed: Jan. 16, 2017

(86) PCT No.: PCT/JP2017/001188
§ 371 (c)(1),
(2) Date: Jul. 2, 2018

(87) PCT Pub. No.: WO2017/208492
PCT Pub. Date: Dec. 7, 2017

(65) Prior Publication Data
US 2019/0018921 A1    Jan. 17, 2019

(30) Foreign Application Priority Data

May 30, 2016 (JP) .............................. JP2016-107710

(51) Int. Cl.
*G06F 17/50* (2006.01)
*G06F 17/18* (2006.01)
(Continued)

(52) U.S. Cl.
CPC .............. *G06F 30/17* (2020.01); *G06F 17/18* (2013.01); *G06F 30/13* (2020.01); *G06F 30/20* (2020.01);
(Continued)

(58) Field of Classification Search
CPC ...... G06F 17/18; G06F 2113/14; G06F 30/13; G06F 30/17; G06F 30/20; G21D 1/006; G21D 1/02; Y02E 30/40
(Continued)

(56) References Cited

U.S. PATENT DOCUMENTS

2015/0340108 A1   11/2015  Hinami et al.

FOREIGN PATENT DOCUMENTS

| JP | S60-185809 U | 12/1985 |
|----|--------------|---------|
| JP | S62-136788 U | 8/1987 |

(Continued)

OTHER PUBLICATIONS

Sauve, R.G. et al.: "Application of flow-induced vibration predictive techniques to operating steam generators". Canadian Nuclear Society, Toronto, ON (Canada); 839 p; ISBN 0-919784-59-3; Worldcat; 1998; p. 343-357; International steam generator and heat exchanger conference; Toronto, ON (Canada); Jun. 1998.*

(Continued)

*Primary Examiner* — John H Le
(74) *Attorney, Agent, or Firm* — Westerman, Hattori, Daniels & Adrian, LLP

(57) ABSTRACT

There is provided a contact force evaluation method for evaluating a contact force against a supporting member of a tube bundle positioned in a fluid and supported by the supporting member, including a contact force setting step of setting a contact force of the tube bundle, a probability density function calculation step of calculating a probability density function of a reaction force received by the support- (Continued)

ing member from the tube bundle in response to a predetermined input, using a vibration analysis model of the tube bundle and the supporting member, a probability calculation step of calculating a probability that a reaction force equal to or higher than the set contact force occurs, based on the calculated probability density function, and an evaluation step of evaluating the set contact force, based on the calculated probability.

9 Claims, 11 Drawing Sheets

(51) Int. Cl.
*G06F 30/17* (2020.01)
*G06F 30/13* (2020.01)
*G06F 30/20* (2020.01)
*G21D 1/00* (2006.01)
*G06F 113/14* (2020.01)
*G21D 1/02* (2006.01)

(52) U.S. Cl.
CPC .......... *G21D 1/006* (2013.01); *G06F 2113/14* (2020.01); *G21D 1/02* (2013.01); *Y02E 30/30* (2013.01)

(58) Field of Classification Search
USPC ........... 702/34, 41, 42, 43, 56, 81, 137, 181; 73/760, 789
See application file for complete search history.

(56) References Cited

FOREIGN PATENT DOCUMENTS

| JP | 2014-041102 A | 3/2014 |
| JP | 2014-161982 A | 9/2014 |
| JP | 2014-164323 A | 9/2014 |
| WO | 2014/030718 A1 | 2/2014 |
| WO | 2014/132678 A1 | 9/2014 |

OTHER PUBLICATIONS

Rubiolo Pablo R. et al., : "Probabilistic prediction of fretting-wear damage of nuclear fuel rods", Nuclear Engineering and Design, 2006, pp. 1628-1640, Cited in Extended EP Search Report dated May 20, 2019.

Morandin Greg D. et al., "Probabilistic Assessment of Fretting Wear in Steam Generator Tubes Under Flow Induced Vibrations", Flow-Induced Vibration, 2003, vol. 465, pp. 117-125; Cited in Extended EP Search Report dated May 20, 2019.

Sauve R.G. et al., "Probabilistic Methods for the Prediction of Damage in Process Equipment Tubes Under Nonlinear Flow Induced Vibration", Fluid-Structure Interaction, Aeroelasticity, Flow-Induced Vibration and Noise, 1997, pp. 283-289; Cited in Extended EP Search Report dated May 20, 2019.

Hassan Marwan et al., "A Numerical Characterization of Flow-Induced Vibration and Fretting Wear Potential in Nuclear Steam Generator Tube Bundles", ASME Preassure Vessles & Piping Division Conference, 2011, vol. 4, pp. 141-149; Cited in Extended EP Search Report dated May 20, 2019.

Extended Search Report dated May 20, 2019, issued in countepart EP Application No. 17806054.7 (15 pages).

\* cited by examiner

Synthesis

Synthesis

CONTACT FORCE EVALUATION METHOD

TECHNICAL FIELD

The present disclosure relates to structure loading evaluation and more specifically relates to a contact force evaluation method for evaluating a contact force to a supporting member for a tube bundle disposed in a fluid and supported by the supporting member.

BACKGROUND ART

A heat-transfer tube bundle of a steam generator, which is a large heat exchanger, is provided with anti-vibration bars for restricting the tube vibration in order to prevent the tubes from largely vibrating due to two-phase flow outside the tubes. Unfortunately, providing the anti-vibration bars in the tube bundle are not enough, for a small gap is left between the tubes and the anti-vibration bars. Thus, although this provision can prevent the tubes from vibrating in an anti-vibration bar direction, it cannot prevent the tubes from vibrating in a flow direction (in-plane direction) perpendicular to the anti-vibration bar direction (out-of-plane direction). In recent years, it is reported that fluid elastic vibration occurs in the steam generator in the flow direction (in-plane direction). It is therefore required to restrict the vibration in the flow direction.

To this end, it is suggested to insert anti-vibration bars thicker than a gap between tubes to increase a contact force of the tubes and the anti-vibration bars, restricting the vibration in the flow direction. However, if the contact force is insufficient, a random excitation force is generated along and perpendicular to the flow direction due to the two-phase flow outside the tubes, which can cause the tubes to slide and vibrate in the flow direction relative to the anti-vibration bars, resulting in fluid elastic vibration in the flow direction, as well as wear. Accordingly, there is a demand of a technique for estimating to what extent is a contact force required for preventing the tubes from sliding in the in-plane direction by a random excitation force due to the two-phase flow.

Patent Document 1 discloses a technique in which an operator enters a steam generator and precisely measures the connection strength between a heat-transfer tube and an anti-vibration bars without accessing a portion where the heat-transfer tube is supported by the anti-vibration bars. Patent Document 2 discloses a vibration-resistant evaluation method that enables evaluation of stress locally generated in a steam generator taking into consideration the elastoplasticity of a structural material of the steam generator, for evaluating the vibration-resistant margin of the steam generator.

CITATION LIST

Patent Literature

Patent Document 1: JP2014-041102A
Patent Document 2: JP2014-164323A

SUMMARY

Problems to be Solved

However, the inventions of Patent Document 1 and Patent Document 2 fail to disclose or suggest a technique for estimating to what extent is a contact force required for preventing tubes constituting a steam generator from sliding in the in-plane direction by a random excitation force due to the two-phase flow. In particular, in a case where the flow rate of the two-phase flow is increased to improve the heat-exchange efficiency of the steam generator, self-excited vibration (fluid elastic vibration), which can cause damage to the tube bundle when the flow rate exceeds a predetermined value, can occur. However, the inventions of Patent Document 1 and Patent Document 2 are difficult to appropriately estimate a sufficient contact force for suppressing the self-excited vibration.

In view of the above problems, an object of some embodiments of the present invention is to achieve a contact force evaluation method for estimating to what extent is a contact force required for preventing tubes, which constitute a tube bundle supported by friction with a supporting member in a fluid, from causing the self-excited vibration due to an excitation force of the fluid.

Solution to the Problems (1) According to some embodiments of the present invention, there is provided a contact force evaluation method for evaluating a contact force against a supporting member of a tube bundle positioned in a fluid and supported by the supporting member, the method comprising: a contact force setting step of setting a contact force of the tube bundle; a probability density function calculation step of calculating a probability density function of a reaction force received by the supporting member from the tube bundle in response to a predetermined input, using a vibration analysis model of the tube bundle and the supporting member; a probability calculation step of calculating a probability that a reaction force equal to or higher than the set contact force occurs, based on the calculated probability density function; and an evaluation step of evaluating the set contact force, based on the calculated probability.

In the above method (1), a probability density function of a reaction force received by the supporting member from the tube bundle is calculated by using a vibration analysis model of the tube bundle and the supporting member; a possibility that the reaction force is equal to or higher than the set contact force is obtained based on the probability density function; and the set contact force is evaluated based on the probability. Thus, with the above method (1), even if the reaction force received by the supporting member from the tube bundle randomly varies over time, it is possible to quantitatively judge whether the contact force is sufficient or not, in accordance with the probability that the reaction force is equal to or higher than the set contact force. As a result, with the above method (1), it is possible to appropriately estimate to what extent is a contact force required for preventing each tube of the tube bundle supported by friction with the supporting member in a fluid from causing the self-excited vibration due to an excitation force of the fluid.

(2) In an exemplary embodiment, in the above method (1), the probability density function calculation step includes: performing a time history response analysis on the vibration analysis model using the predetermined input to obtain a time history response; calculating an average value and a standard deviation of the reaction force, based on the time history response; and calculating the probability density function as a normal distribution defined by the average value and the standard deviation.

In the above method (2), an average value and a standard deviation of the reaction force received by the supporting member from the tube bundle are calculated based on the time history response obtained by the time history response analysis on the vibration analysis model using a predetermined input; and the probability density function is calculated as a normal distribution defined by the average value and the standard deviation. As a result, in the above method (2), it is possible to more precisely estimate a necessary contact force required to suppress the self-excited vibration according to actual situation, for the following reasons.

That is, the time history response obtained by the time history response analysis on the vibration analysis model reflects a time-dependent variation of the reaction force which appears only during a period of performing the time history response analysis but does not reflect a time-dependent variation of the reaction force over an entire period of operating a structure including the tube bundle and the supporting member. On the other hand, if the reaction force randomly varies over time, it is considered that the probability distribution of the reaction force over the entire period of operating the apparatus (e.g., steam generator) including the tube bundle and the supporting member can be approximated by the normal distribution. In view of this, in the above method (2), the normal distribution defined by the average value and the standard deviation of the reaction force obtained based on the time history response is used as the probability density function used for estimating the probability that the reaction force is equal to or higher than the set contact force. That is, in the above method (2), since the normal distribution is used as the probability density function of the reaction force, it is possible to obtain the probability that the reaction force is equal to or higher than the set contact force, taking into consideration the time-dependent variation of the reaction force over the entire operation period of the apparatus including the tube bundle and the supporting member.

(3) In an exemplary embodiment, in the above method (1) or (2), the probability density function is calculated by synthesizing a first probability density function and a second probability density function, the first probability density function corresponding to a first reaction force received by the supporting member in a tangential direction from a contact surface between the supporting member and the tube bundle, the second probability density function corresponding to a second reaction force received by the supporting member in a normal direction from the contact surface.

In the above method (3), the reaction force received by the supporting member from the tube bundle is resolved into the first reaction force which acts in a tangential direction from a contact surface between the supporting member and the tube bundle and the second reaction force which acts in a normal direction from the contact surface so as to be resolved into perpendicular components. In addition, in the above method (3), two probability density functions separately obtained for each of the first reaction force and the second reaction force are synthesized to calculate the probability density function of the reaction force. Thus, in the above method (3), even if the direction of action and the magnitude of the reaction force received by the supporting member from the tube bundle irregularly vary over the entire tube bundle, resolving the reaction force into two perpendicular components allows simplification of the construction of the vibration analysis model as well as the calculation of the probability density function.

(4) In an exemplary embodiment, in the above methods (1) to (3), the evaluation step including: estimating a wear amount which occurs between the tube bundle and the supporting member during a predetermined period, based on the calculated probability; and evaluating the set contact force, based on the estimated wear amount.

In the above method (4), a wear amount which occurs between the tube bundle and the supporting member during a predetermined period is estimated based on the probability that the reaction force which acts on the supporting member from the tube bundle is equal to or higher than the set contact force; and the set contact force is evaluated based on the estimated wear amount. As a result, even if the contact force acting between the tube bundle and the supporting member decreases in accordance with the wear amount which occurs between the tube bundle and the supporting member, it is possible to estimate the set contact force taking into consideration the decrease in contact force.

Additionally, in the above method (4), drawing attention to the fact that sliding friction occurs between the tube bundle and the supporting member when the reaction force acting on the supporting member from the tube bundle is equal to or higher than the set contact force, the wear amount which occurs between the tube bundle and supporting member is estimated in accordance with the occurrence probability of the sliding friction. In this context, in the above method (4), the probability that the reaction force is equal to or higher than the set contact force is calculated based on a relationship between the probability density function obtained through the time history response analysis on the vibration analysis model and the set contact force. Thus, in the above method (4), it is unnecessary to actually measure the wear amount which occurs between the tube bundle and the supporting member during a predetermined period as well as the probability that the sliding friction occurs between the tube bundle and the supporting member by experimental approach, and it is possible to obtain these values by analytical calculation.

(5) In an exemplary embodiment, in the above method (4), the method further comprises a power calculation step of calculating a power based on a work amount which occurs when a minute displacement is caused between the tube bundle and the supporting member due to the set contact force, wherein the evaluating step includes: estimating a slippage occurrence time caused during the predetermined period, based on the probability; and multiplying the power by the slippage occurrence time to estimate the wear amount.

In the above method (5), the wear amount per unit time which occurs between the tube bundle and the supporting member is obtained as the power calculated from the amount of work which occurs when small displacement is caused between the tube bundle and the supporting member due to the contact force. Thus, in the above method (5), it is possible to quantify the wear amount per unit time as the power obtained from the amount of work which occurs when small displacement is caused between the tube bundle and the supporting member due to the contact force, without describing contact characteristics and friction characteristics between the tube bundle and the supporting member by a complicated dynamical system model. As a result, with the above method (5), it is possible to calculate the wear amount per unit time which occurs between the tube bundle and the supporting member with simple arithmetic in a short time.

Additionally, in the above method (5), drawing attention to the fact that sliding friction occurs between the tube bundle and the supporting member when the reaction force acting on the supporting member from the tube bundle is equal to or higher than the set contact force, the wear amount which occurs between the tube bundle and supporting member is estimated in accordance with the occurrence time of the sliding friction. In this context, in the above method (5), the occurrence time of the sliding friction is calculated based on a relationship between the probability density function obtained through the time history response analysis on the vibration analysis model and the set contact force. Thus, with the above method (5), it is unnecessary to actually measure the wear amount which occurs between the tube bundle and the supporting member during a predetermined period as well as the length of the time during which the sliding friction occurs between the tube bundle and the supporting member by experimental approach, and it is possible to obtain these values by analytical calculation.

(6) In an exemplary embodiment, in the above method (4) or (5), the method further comprises an equivalent stiffness calculation step of calculating an equivalent stiffness of the tube bundle, wherein the evaluating step includes; calculating a decrease in the contact force, based on the wear amount and the equivalent stiffness; and evaluating the set contact force, based on whether the calculated decrease is equal to or lower than a threshold.

In the above method (6), the equivalent stiffness of the tube bundle is calculated; a decrease in contact force is calculated based on the wear amount due to sliding friction between the tube bundle and the supporting member and the equivalent stiffness; and thereby the set contact force is evaluated based on the judgment whether the decrease in contact force is equal to or lower than a threshold. Thus, in the above method (6), it is possible to calculate the decrease in contact force based on the wear amount and the equivalent stiffness by previously obtaining the equivalent stiffness of the entire tube bundle. Consequently, with the above method (6), after the wear amount is analytically calculated with the above method (4) or (5), it is possible to calculate the decrease in contact force with simple arithmetic in a short time, using the value of the previously calculated equivalent stiffness.

(7) In an exemplary embodiment, in the above method (6), the equivalent stiffness calculation step includes applying a finite-element method to the tube bundle to calculate the equivalent stiffness.

With the above method (7), it is possible to obtain the equivalent stiffness of the entire tube bundle by structure-analytical calculation, without actually measuring the equivalent stiffness by experimental approach.

(8) In an exemplary embodiment, in the above methods (1) to (7), the tube bundle includes at least one tube array composed of a plurality of U-shaped tubes, the U-shaped tubes extending in same plane, having a common curvature center, and having bent parts with different curvature radii from each other, the supporting member includes at least a pair of anti-vibration members disposed on both sides of the tube array and extending along the plane so that the tube array is interposed therebetween, and evaluation is performed for a contact load force which needs to be applied between the anti-vibration members and the tube array so as to suppress the self-excited vibration of the tube bundle, which is supported by friction with the anti-vibration members, in a direction along the plane, against an excitation force of the fluid flowing through the tube bundle.

In a typical heat exchanger, the tube bundle is composed of a plurality of U-shaped tubes each having a U-shaped bent part; and anti-vibration members may be inserted between the bent parts of adjacent U-shaped tubes in an out-of-plane direction perpendicular to the plane containing the bent parts. In this case, the anti-vibration members inserted between the adjacent tube arrays restrict movement of each U-shaped tube (bent part) in the out-of-plane direction.

Thus, when an exciting force is applied in the out-of-plane direction, the tube bundle vibrates as a whole. However, a series of the U-shaped tubes arranged in the in-plane direction along the plane containing the bent parts is restricted only by friction with the anti-vibration members on both sides. Therefore, in the above methods (1) to (6), the direction in which each tube vibrates is substantially coincident with the in-plane direction, and a contact load caused by collision between the tube and the adjacent anti-vibration members is mostly derived from the friction in the in-plane direction.

Thus, in the above method (8), in the plane (in-plane direction) of extending the tube array composed of the U-shaped tubes with the bent parts, the friction received by the tube array from the adjacent anti-vibration members is caused to act against the excitation force applied to each U-shaped tube. Under such conditions, the above method (8) allows a sufficient structural strength for suppressing fluid elastic vibration of the tube bundle in the in-plane direction to be appropriately evaluated as the necessary contact force between the anti-vibration members and the tube array composed of a series of the U-shaped tubes.

(9) In an exemplary embodiment, in the above methods (1) to (8), the tube bundle is a heat-transfer tube bundle of a steam generator of a PWR nuclear power generating plant.

Thus, in the above method (9), in a case where the heat exchanger, such as a steam generator, is provided in a nuclear-power-related facility including a pressurized water reactor, it is possible to previously evaluate a strength required for the tube bundle disposed in a fluid for heat exchange to prevent the self-excited vibration, as the necessary contact force between the tube bundle and the supporting member.

Advantageous Effects

As described above, in some embodiments of the present invention, it is possible to estimate a contact force required for preventing the self-excited vibration of tubes, constituting a tube bundle supported by friction with a supporting member in a fluid, due to an excitation force of the fluid.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention. Hereinafter, prior to describing a necessary contact force evaluation method for a tube bundle according to some embodiments, a structure of a heat-transfer tube bundle to which the necessary contact force evaluation method is applied will be described with reference to FIGS. 1 to 4. Next, process details of the necessary contact force evaluation method will be described with reference to FIGS. 5 to 9.

Figure 1:
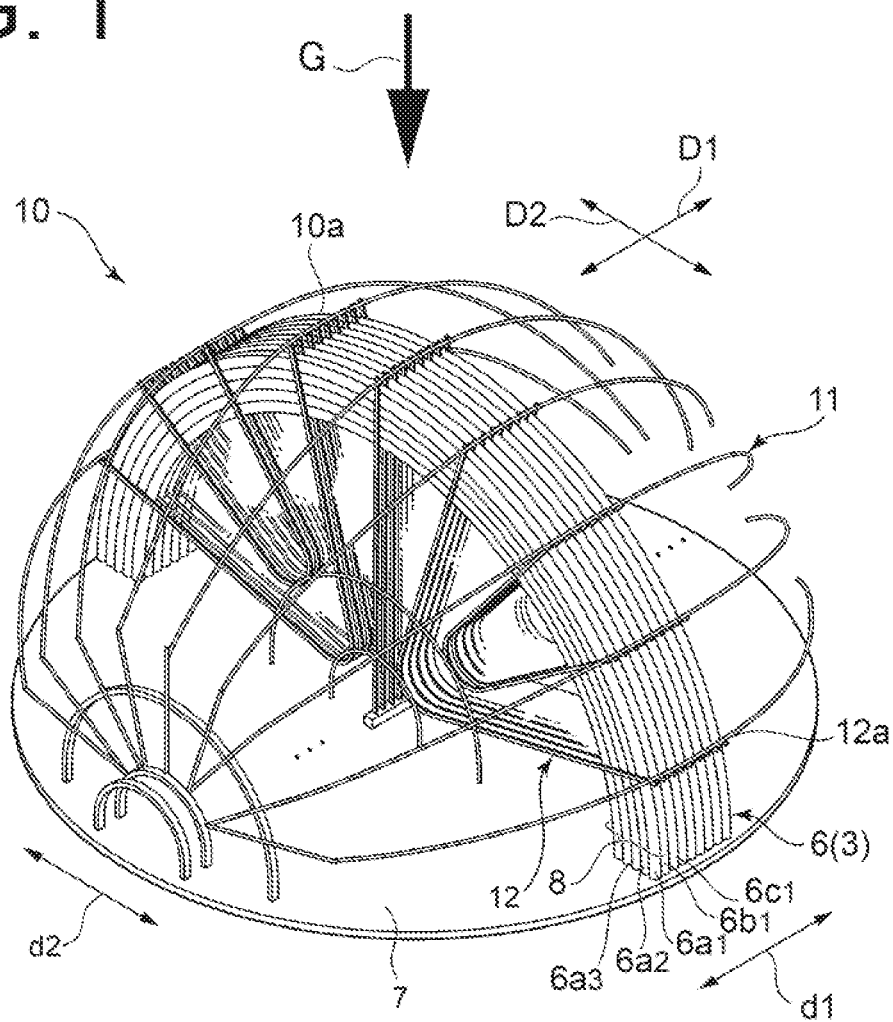
FIG. 1 is a perspective view of a U-bent portion of a heat-transfer tube bundle according to an embodiment.
Figure 2:
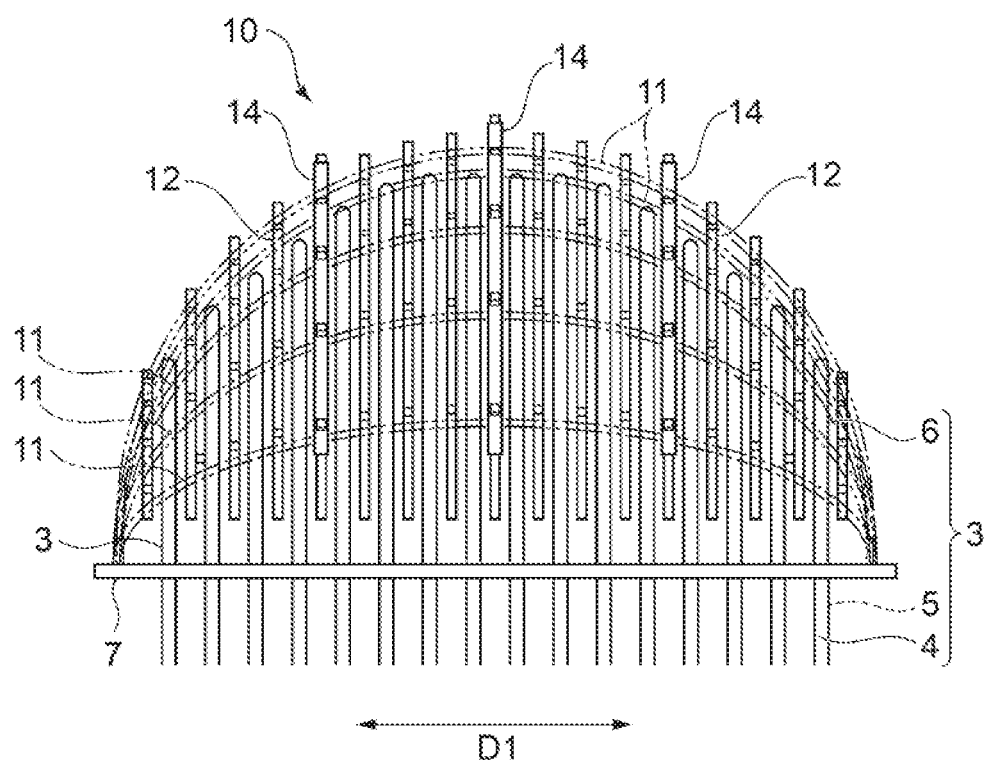
FIG. 2 is a diagram showing an example of a support structure by an anti-vibration member viewed from an in-plane direction.
Figure 3:
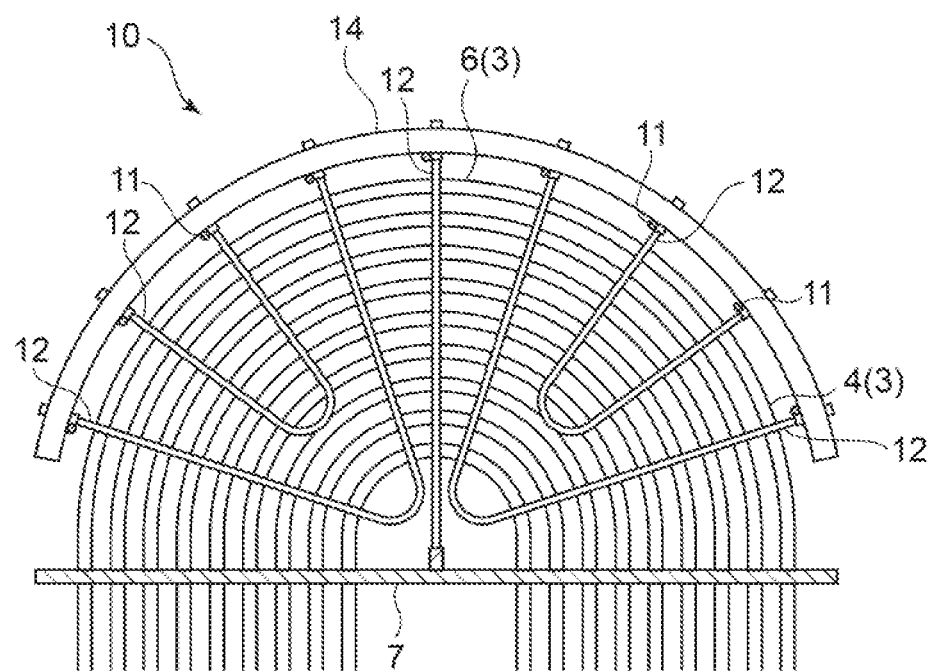
FIG. 3 is a diagram showing an example of a support structure by an anti-vibration member viewed from an out-of-plane direction.

FIG. 1 is a perspective view of a U-bent portion 10a of a heat-transfer tube bundle 10 according to an embodiment. FIG. 2 is a side view of the heat-transfer tube bundle 10 viewed from an in-plane direction D2 in FIG. 1 (array direction d2 in FIG. 1). FIG. 3 is a side view of the heat-transfer tube bundle 10 viewed from an out-of-plane direction D1 in FIG. 1 (array direction d1 in FIG. 1). In FIG. 1, some components are omitted for clarity. The components omitted in FIG. 1 are illustrated in FIGS. 2 and 3, which are side views of the heat-transfer tube bundle 10 in FIG. 1.

In some embodiments, the heat-transfer tube bundle 10 includes a plurality of heat-transfer tubes 3 and a tube support plate 7 into which the plurality of heat-transfer tubes 3 is inserted, and the heat-transfer tube bundle 10 is configured to generate steam by heat exchange with a fluid flowing through the plurality of heat-transfer tubes 3. Each of the heat-transfer tubes 3 has a first straight tube part 4 positioned on a fluid inlet side, a second straight tube part 5 positioned on a fluid outlet side, and a bent part 6 positioned between the first straight tube part 4 and the second straight tube part 5. The tube support plate 7 is provided with a plurality of through holes into which the first straight tube part 4 and the second straight tube part 5 are inserted.

The heat-transfer tube bundle 10 is composed of a plurality of heat-transfer tubes 3 each having a U-shaped bent part 6. The U-shaped bent parts 6 of the plurality of heat-transfer tubes 3 form a U-bent portion 10a. In the structure shown in FIG. 1, some heat-transfer tubes 3 are concentrically arranged around a common curvature center in the same plane (along the in-plane direction D2) so that a heat-transfer tube 3 having a bent part 6 with a larger curvature radius is positioned at an outer portion (upper portion in FIG. 1) in a radial direction of the bent part 6 (tube array 8 in FIG. 1). FIG. 3 shows that a plurality of tube arrays 8, each containing the heat-transfer tubes 3 arranged along the in-plane direction D2, is disposed in a row, and these tube arrays 8 are arranged in a direction (out-of-plane direction D1 in FIG. 1) perpendicular to the plane containing the bent parts 6.

As shown in FIGS. 1 and 3, the curvature radius of the bent part 6 of the heat-transfer tube 3 positioned on the most outer peripheral side in each of the tube arrays 8 varies with the position of the corresponding tube array 8 in the out-of-plane direction D1. In this way, a semi-spherical U-bent portion 10a is formed at an upper end of the heat-transfer tube bundle 10 by changing the curvature radius of the bent part 6 and stacking the plurality of tube arrays 8 in the out-of-plane direction D1. As a result, as shown in FIG. 1, a plurality of bent parts $6a_1$, $6a_2$, $6a_3$ . . . with different curvature radii are arranged along the in-plane direction D2, and a plurality of bent parts $6a_1$, $6b_1$, $6c_1$ . . . with the same curvature radius are arranged along the out-of-plane direction D1.

In the heat-transfer tube bundle 10, an anti-vibration member 12 is inserted between bent parts 6 of adjacent heat-transfer tubes 3 in the out-of-plane direction D1 perpendicular to the plane containing the bent parts 6 to restrict movement of the plurality of heat-transfer tubes 3 (bent parts 6) in the out-of-plane direction D1. For instance, in FIG. 1, a plurality of anti-vibration members 12 is inserted along the in-plane direction D2 on both sides of each of the tube arrays 8 arranged in the out-of-plane direction D1 so as to restrict movement of the bent parts 6 of the plurality of heat-transfer tubes 3 belonging to the corresponding tube array 8 in the out-of-plane direction D1.

As shown in FIG. 1, a first retention member 11 is an arc-shaped rod-like member mounted along the outer circumference of the U-bent portion 10a, i.e., the outer circumference of the semi-spherical U-bent portion 10a. The above-described anti-vibration members 12 extend inward in a radial direction of the semi-spherical U-bent portion 10a from the first retention member 11. To end parts 12a of the anti-vibration members 12, as shown in FIG. 1, the first retention member 11 is welded to connect the end parts 12a of the plurality of anti-vibration members 12. The first retention member 11 is perpendicular to the tube arrays 8, in which the plurality of heat-transfer tubes 3 is stacked along the in-plane direction D2, and extends along the semi-spherical surface of the U-bent portion 10a.

As shown in FIGS. 2 and 3, a plurality of first retention members 11 may be connected by a second retention member (bridge) 14. The second retention member 14 is an arc-shaped plate-like member disposed along the outer circumference of the U-bent portion 10a, i.e., the outer circumference of the semi-spherical U-bent portion 10a. The second retention member 14 extends along a direction of extending the bent parts 6 of the heat-transfer tubes 3 in the U-bent portion 10a. A plurality of second retention members 14 may be arranged in the out-of-plane direction D1.

In the heat-transfer tube bundle 10, the anti-vibration members 12 inserted between the bent parts 6 of the adjacent heat-transfer tubes 3 in the out-of-plane direction restrict movement of the plurality of heat-transfer tubes 3 (bent parts 6) in the out-of-plane direction D1. Thus, when an exciting force is applied in the out-of-plane direction D1, the heat-transfer tube bundle 10 vibrates as a whole. However, a series of the heat-transfer tubes 3 (tube array 8 in FIG. 1) arranged in the in-plane direction D2 along the plane containing the bent parts 6 is not connected to the anti-vibration members 12 on both sides. The restriction is based on only friction with the anti-vibration members 12 on both sides. As a result, the direction in which each heat-transfer tube 3 vibrates is substantially coincident with the in-plane direction D2, and a contact load caused by collision between the heat-transfer tube 3 and the adjacent anti-vibration member 12 is mostly derived from the friction in the in-plane direction D2.

In an exemplary embodiment, the heat-transfer tube bundle 10 described with reference to FIGS. 1 to 3 may be a heat-transfer tube bundle of a steam generator for heat exchange between primary cooling water and secondary cooling water in a pressurized water reactor (PWR) type nuclear power generating plant. In this case, the secondary cooling water flows from just above the U-bent portion 10a to just below the U-bent portion 10a along a direction G perpendicular to the out-of-plane direction D1 and the in-plane direction D2 shown in FIG. 1, thereby performing heat exchange with the primary cooling water flowing through the heat-transfer tubes 3. Thus, the flow of the secondary cooling water is cross-flow perpendicular to the bent parts 6 of the heat-transfer tubes 3 at the uppermost part of the U-bent portion 10a. As described above, the necessary contact force evaluation method according to some embodiments of the present invention may be performed to previously evaluate a strength required for the heat-transfer tube bundle 10 disposed in a fluid of the secondary cooling water for heat exchange to prevent the self-excited vibration, as a necessary contact force between the heat-transfer tube bundle 10 and the anti-vibration members 12.

Next, a vibration control structure for suppressing vibration which occurs in the heat-transfer tube bundle 10 due to an excitation force applied to the heat-transfer tube bundle 10 will be described with reference to FIG. 4. The vibration control structure shown in FIG. 4 is a support structure in which contact force $F_{pin}$ is imparted to the anti-vibration members 12 at the U-bent portion 10a of the heat-transfer tube bundle 10 so that a contact load acts between the heat-transfer tube 6 and the anti-vibration members 12 to support the heat-transfer tube 6.

Figure 4A:
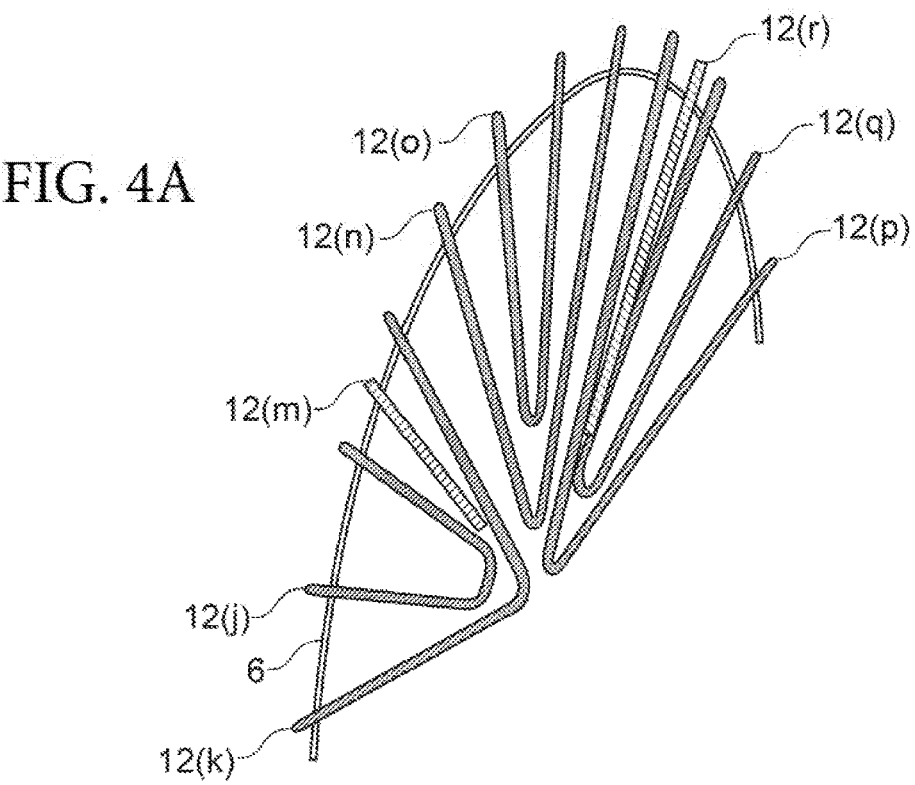
FIGS. 4A-4C are diagrams showing a vibration control structure in which heat-transfer tubes are supported by imparting a contact force to anti-vibration members in a heat-transfer tube bundle.
Figure 4B:
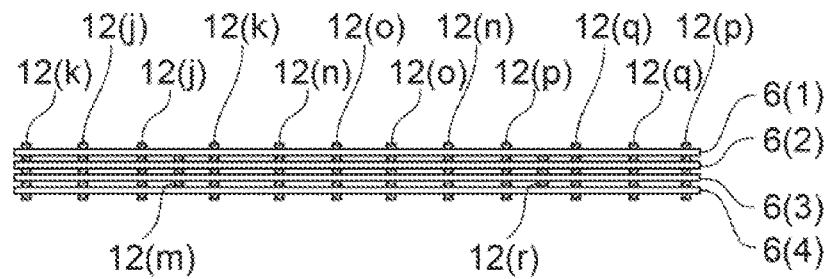

FIG. 4(A) shows a state where six V-shaped anti-vibration members 12k, 12j, 12n, 12o, 12p, and 12q and two rod-like anti-vibration members 12m and 12r are disposed in parallel to a plane in which the bent part 6 of one heat-transfer tube 3 funs with a certain curvature radius. Here, the bent part 6 and the anti-vibration members 12k, . . . , 12r are in contact with each other so that a contact load is mutually applied. FIG. 4(B) shows a structure in which the anti-vibration members 12k, . . . , 12r are in contact with bent parts 6(1) to 6(4) of four adjacent heat-transfer tubes in one tube array 8 so as to be perpendicular to a lengthwise direction of extending the bent parts 6(1) to 6(4), in a state of stretching in the lengthwise direction of the bent parts 6.

In the example shown in FIG. 4(A) and FIG. 4(B), the anti-vibration members 12k, 12j, 12n, 12o, 12p, 12q, 12m, and 12r impart a contact force to the bent part 6 of the heat-transfer tube 3. Thus, a contact load acts between the heat-transfer tube 6 and the anti-vibration members 12 to suppress vibration caused in the heat-transfer tube bundle 10. For instance, in the example shown in FIG. 4(A) and FIG. 4(B), the thickness of the anti-vibration members 12m and 12r along the out-of-plane direction D1 (FIG. 1) is made thicker than the other anti-vibration members 12k, 12j, 12n, 12o, 12p, and 12q. In the example shown in FIG. 4(A) and FIG. 4(B), this causes a contact force acting on the bent part 6 of the heat-transfer tube 3 from the anti-vibration members 12m and 12r.

Figure 4C:
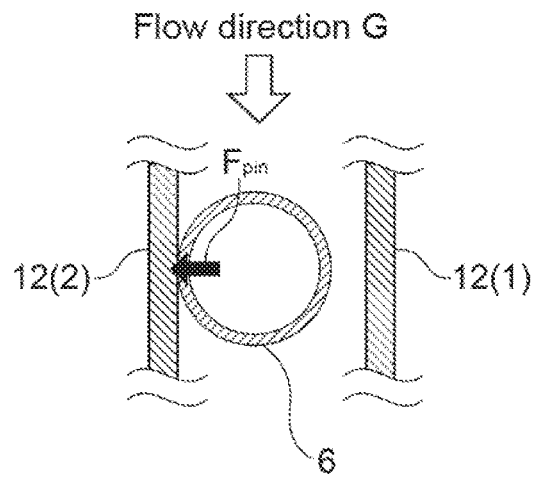

FIG. 4(C) shows displacement amount W applied to a position of the bent part 6 when the bent part 6 of the heat-transfer tube 3 is placed in order to suppress vibration which occurs in the bent part 6 of the heat-transfer tube 3 due to flow of a fluid (second cooling water) flowing along the flow direction G shown in FIG. 1. The displacement amount W is a magnitude of displacement from the bent part 6 toward the anti-vibration member 12 with respect to a contact surface between the bent part 6 and the anti-vibration member 12(2) and corresponds to interference amount between the bent part 6 and the anti-vibration member 12(2). That is, FIG. 4(C) shows a structure in which bending stress in accordance with the interference amount between the bent part 6 and the anti-vibration member 12(2) is generated in the bent part 6 and the anti-vibration member 12(2) by adjusting a relative position of the bent part 6 relative to the anti-vibration member 12(2) by the displacement amount W. In the example shown in FIG. 4(C), the above-described structure causes a contact load to act between the heat-transfer tube 6 and the anti-vibration member 12, thereby suppressing vibration caused in the heat-transfer tube bundle 10 due to the fluid (second cooling water) flowing along the flow direction G.

As described above, when explanation is given for a case where the heat-transfer tube bundle 10 constitutes a steam generator provided in a pressurized water reactor, the heat-transfer tubes 3 through which primary cooling water supplied from the reactor flows are arranged in parallel to form the heat-transfer tube bundle 10, and secondary cooling water flows over an outer surface of a heat transfer portion of the heat-transfer tube bundle 10 to perform heat exchange. In this steam generator, it is necessary to increase the flow rate of the secondary cooling water and improve the efficiency of heat exchange. However, if the flow rate exceeds a limit flow rate, the self-excited vibration can occur in the heat-transfer tube bundle 10. This self-excited vibration is an unstable structural behavior in which movement of the heat-transfer tube bundle 10 and flow of the fluid are mutually affected. Its vibration amplitude increases over time and leads to damage to the heat-transfer tube bundle 10. Thus, the self-excited vibration is a large problem.

In order to prevent the self-excited vibration of the heat-transfer tube bundle in the steam generator, the plurality of heat-transfer tubes 3, whose lower end is supported by the tube support plate 7, is supported by inserting a plurality of anti-vibration members 12 at the U-bent portion 10a of an upper portion. That is, at the U-bent portion 10a of the steam generator, the tube arrays 8, composed of the plurality of heat-transfer tubes 3 arranged along the same plane, are supported by inserting the anti-vibration members 12 therebetween. In this case, a mutual pressing between the anti-vibration member 12 and the heat-transfer tube 3 suppresses vibration of the heat-transfer tube 3. It is thus important to control a contact force between the heat-transfer tube 3 and the anti-vibration member 12. If the contact force is insufficient, the anti-vibration member 12 can fail to appropriately suppress the vibration of the heat-transfer tube 3. As a result, the self-excited vibration is likely to occur in the heat-transfer tube bundle 10 due to the insufficient contact force, which increases a risk of damaging the heat-transfer tube bundle 10. Thus, it is beneficial to previously evaluate a contact force required between the heat-transfer tube 3 and the anti-vibration member 12 in order to prevent the self-excited vibration in the heat-transfer tube bundle 10.

In some embodiments described below, evaluation of self-excited vibration is mainly performed with respect to the bent part 6 of each heat-transfer tube 3 constituting the U-bent portion 10a of the heat-transfer tube bundle 10. Accordingly, in some embodiments below, the U-bent portion 10a of the heat-transfer tube bundle 10 is simply referred to as the heat-transfer tube bundle 10, and the bent part 6 of each heat-transfer tube 3 is simply referred to as the heat-transfer tube 6 or the tube 6.

Figure 5A:
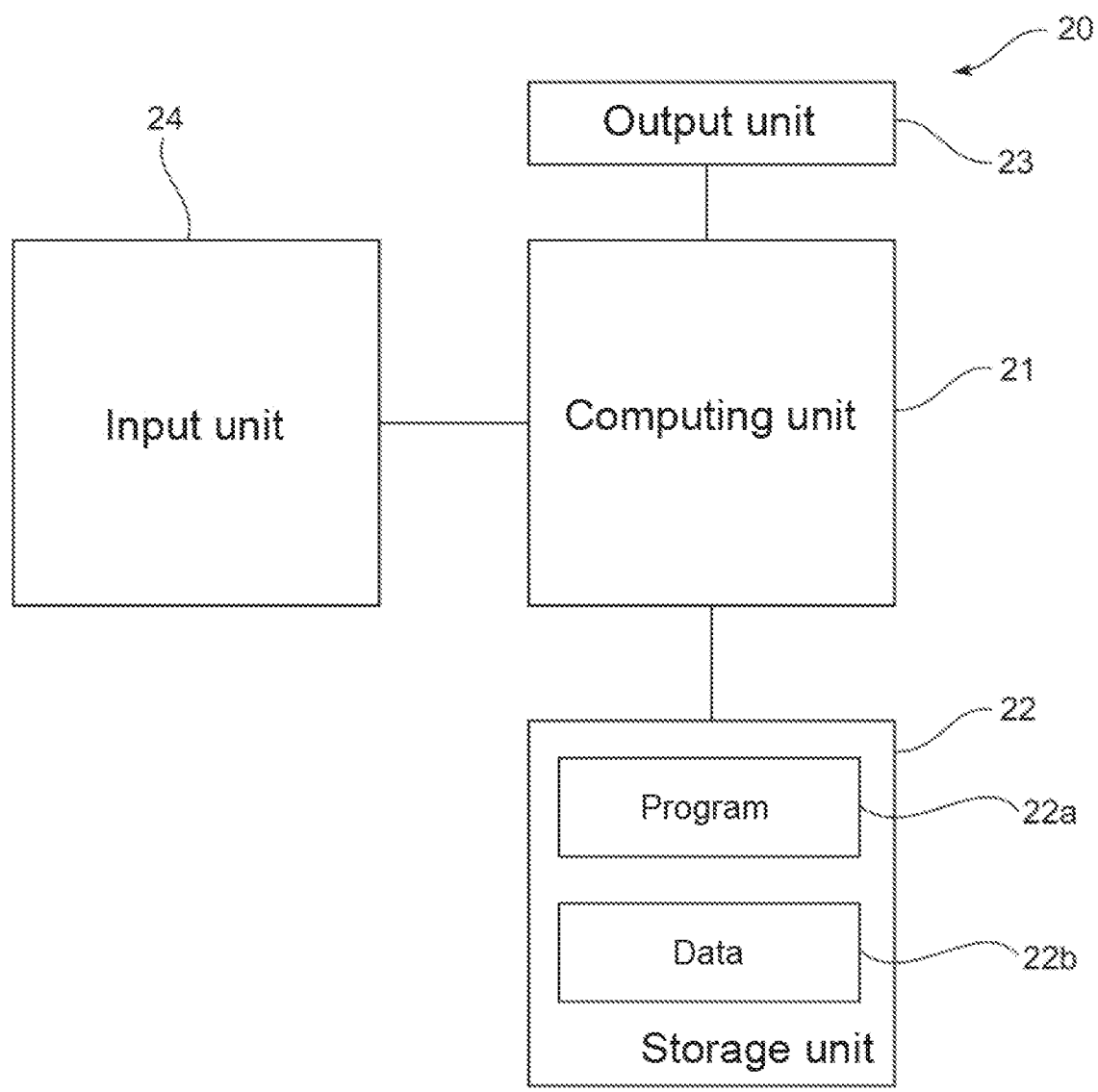
FIG. 5A is a diagram showing a computer device for performing a necessary contact force evaluation method according to an embodiment.

Next, a necessary contact force evaluation method according to some embodiments and a computer device for performing the necessary contact force evaluation method will be described with reference to FIGS. 5 to 9. FIG. 5A is a diagram showing an overall configuration of a computer device 20 for performing a necessary contact force evaluation method according to some embodiments. The computer device 20 includes a computing unit 21, a storage unit 22, an output unit 23, and an input unit 24. In an exemplary embodiment, the computing unit 21 may be configured as an arithmetic circuit which reads and executes a program 22a stored in the storage unit 22 to perform the necessary contact force evaluation method for evaluating a necessary contact force of the heat-transfer tube bundle 10 disposed in a fluid fl and supported by the anti-vibration members 12. In this embodiment, data which needs to be read and written by the computing unit 21 when the necessary contact force evaluation method is performed may be stored as data 22b in the storage unit 22.

The output unit 23 is an output device for presenting a part of computing results of the computing unit 21 or the data 22b stored in the storage unit 22 to a user. In an exemplary embodiment, the output unit 23 may include display means such as a display device as output means. The input unit 24 is an input device for inputting external data representative of various information and parameters in the computing unit 21 by operation of the user. In an exemplary embodiment, the input unit 24 may include input means such as a keyboard or a mouse.

Figure 5B:
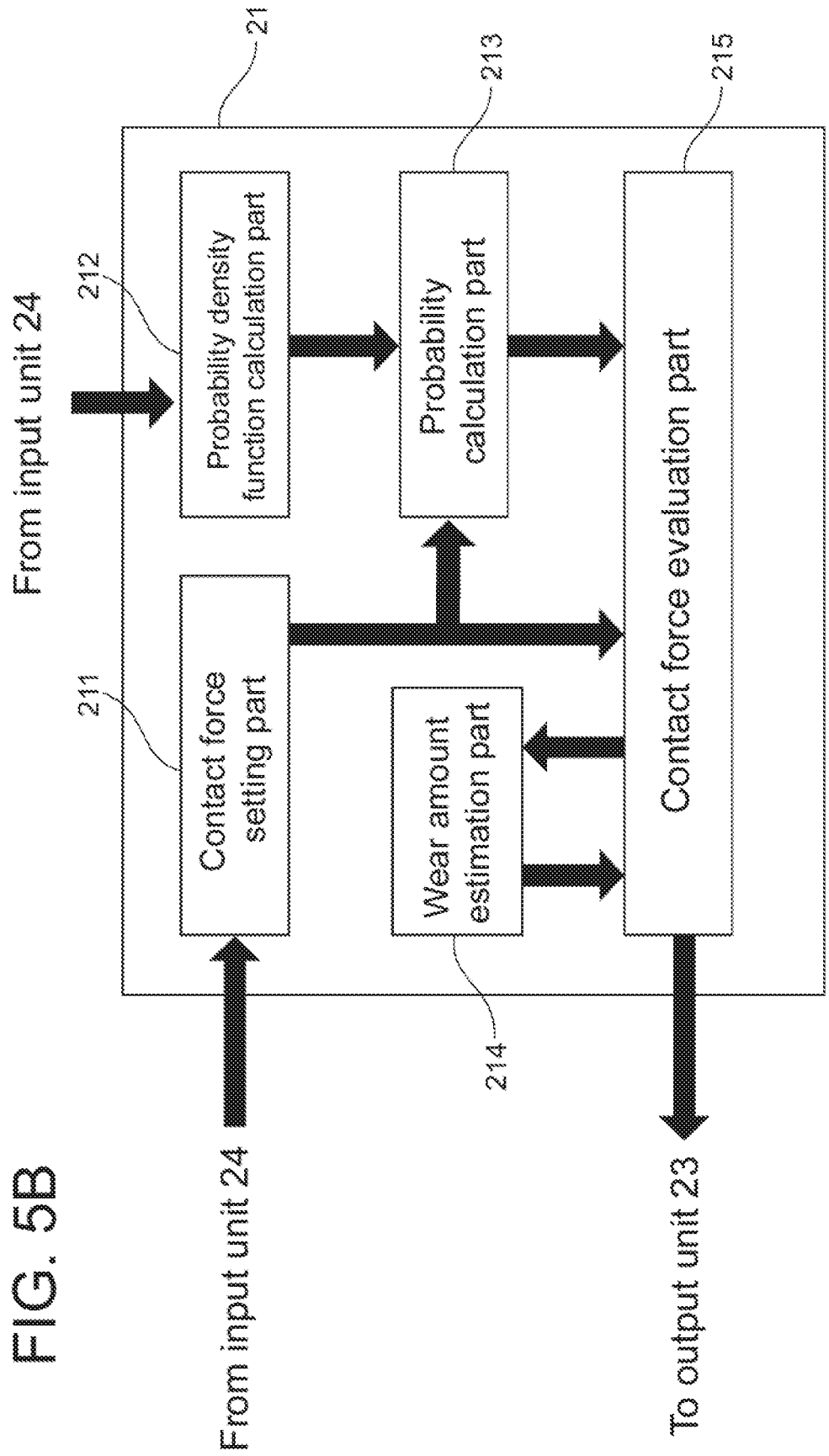
FIG. 5B is a diagram showing an internal configuration of a computing unit of the computer device depicted in FIG. 5A.

FIG. 5B is a diagram showing an internal configuration of the computing unit 21 included in the computer device 20. Referring to FIG. 5B, the computing unit 21 includes a contact force setting part 211, a probability density function calculation part 212, a probability calculation part 213, a wear amount estimation part 214, and a contact force evaluation part 215. In an example, the computing unit 21 may be embodied by a general-purpose processor. In this case, the contact force setting part 211, the probability density function calculation part 212, the probability calculation part 213, the wear amount estimation part 214, and the contact force evaluation part 215 may be embodied as program modules generated in the computing unit 21 when the computing unit 21 reads the program 22a from the storage unit 22. Hereinafter, with the flow chart shown in FIG. 6, the operation of the contact force setting part 211, the probability density function calculation part 212, the probability calculation part 213, the wear amount estimation part 214, and the contact force evaluation part 215 will be described.

Figure 6:
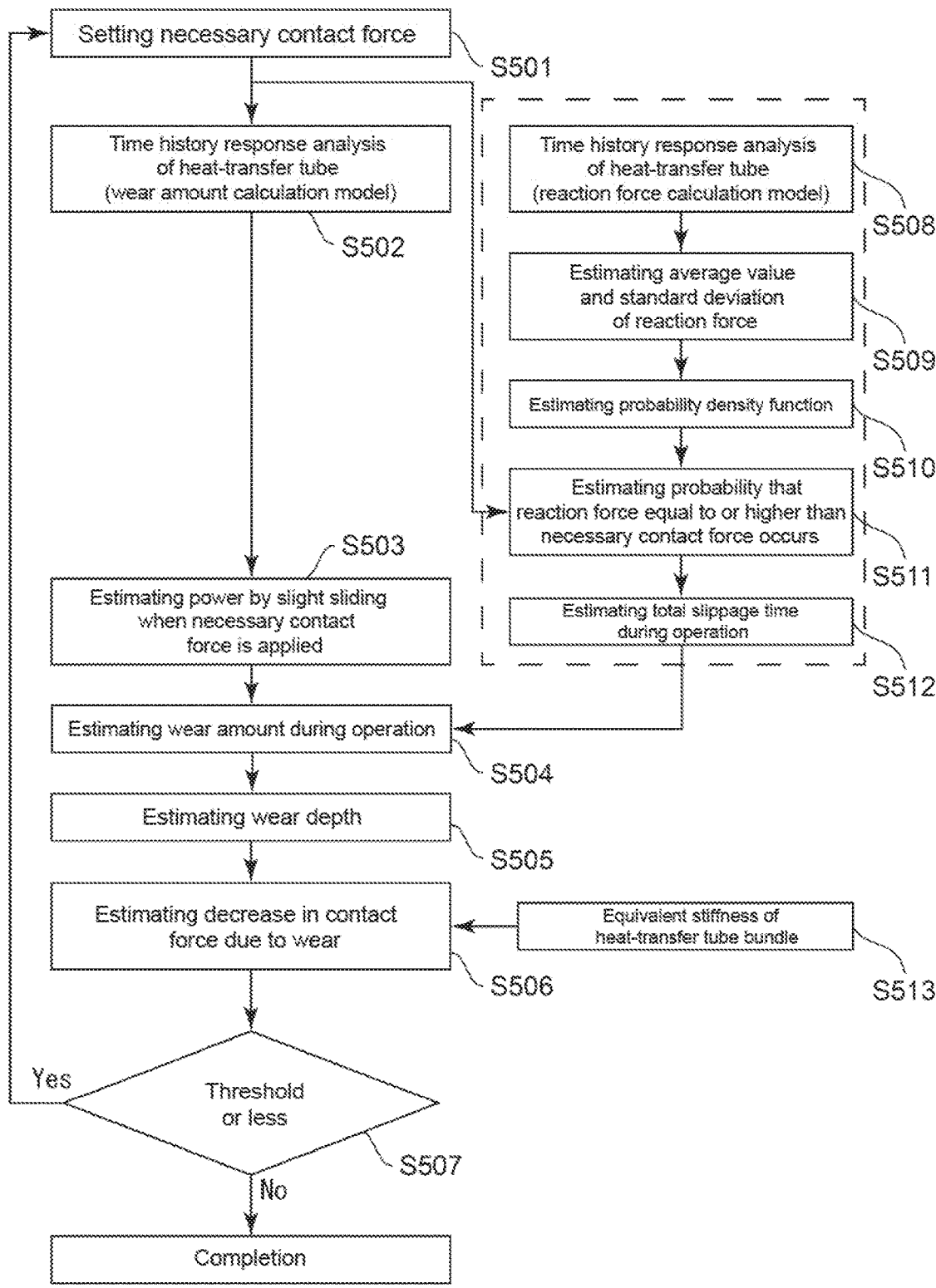
FIG. 6 is a flowchart of a performing process of a necessary contact force evaluation method according to an embodiment.

Once the flow chart shown in FIG. 6 starts to run, the contact force setting part 211 receives a set value from the input unit 24 and starts to perform step S501. The set value which the contact force setting part 211 receives from the input unit 24 represents a set value of a contact force which is presumed to act between the heat-transfer tube 6 and the anti-vibration member 12 in the heat-transfer tube bundle 10. Moreover, once the flow chart shown in FIG. 6 starts to run, the probability density function calculation part 212 receives vibration time-sequential data Dt from the input unit 24 and starts to perform step S508. The vibration time-sequential data Dt which the probability density function calculation part 212 receives from the input unit 24 may be, for instance, time-sequential data representative of the time-dependent change of vibration applied to the heat-transfer tube bundle 10 obtained by simulation. The vibration time-sequential data Dt may be time-sequential data obtained by actually measuring, with a measurement tool, the time-dependent change of vibration of the heat-transfer tube bundle 10 over a past predetermined period.

In step S501, the contact force setting part 211 performs a contact force setting step of setting contact force $F_0$ of the heat-transfer tube bundle 10. Specifically, in step S501, the contact force setting part 211 sets initial value $F_0$ of a contact force which is presumed to act between the heat-transfer tube 6 and the anti-vibration member 12 in the heat-transfer tube bundle 10, based on a set value received from the input unit 24. When the processing of step S501 is completed, the contact force setting part 211 transfers execution control to the contact force evaluation part 215. The contact force evaluation part 215 which takes over execution control from the contact force setting part 211 repeatedly performs step S502 to step S507 described later. At this time, the contact force evaluation part 215 repeatedly performs step S502 to step S507 while calling the wear amount estimation part 214 until necessary contact force $F_{pin}$ which satisfies a predetermined requirement is obtained.

On the other hand, in step S508, the probability density function calculation part 212 performs a time history response analysis on a vibration analysis model of the anti-vibration members 12 and the plurality of heat-transfer tubes 6 constituting the heat-transfer tube bundle 10, using the vibration time-sequential data Dt received from the input unit 24. In an exemplary embodiment, the vibration analysis model of the anti-vibration members 12 and the plurality of heat-transfer tubes 6 constituting the heat-transfer tube bundle 10 may be constructed as a reaction force calculation model 71 shown in FIG. 7. The reaction force calculation model 71 is a vibration analysis model used for modeling an interaction between the plurality of heat-transfer tubes 6 and the anti-vibration members 12 when the probability distribution of reaction force $F_{rv}$ received by the anti-vibration members 12 from the plurality of heat-transfer tubes 6 is calculated by the time history response analysis.

Figure 7:
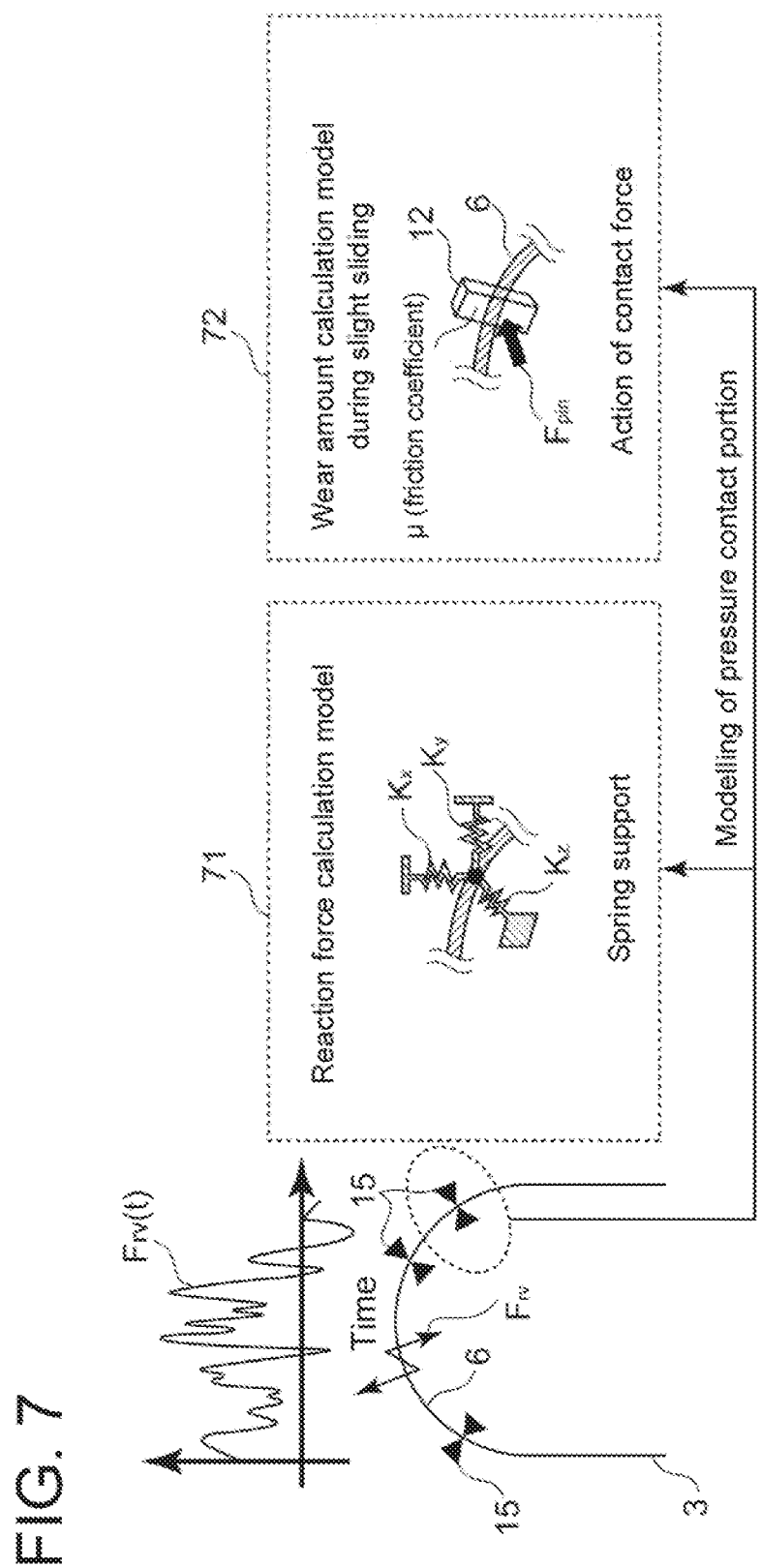
FIG. 7 is a diagram showing a reaction force calculation model and a wear amount calculation model used for a necessary contact force evaluation method according to an embodiment.

Hereinafter, the reaction force calculation model 71 used when the probability distribution of the reaction force $F_{rv}$ received by the anti-vibration members 12 from the plurality of heat-transfer tubes 6 constituting the heat-transfer tube bundle 10 is calculated by the time history response analysis will be described with reference to FIG. 7. The reaction force calculation model 71 defines the reaction force $F_{rv}$ in one or more degree-of-freedom directions of excitation force $F_{ex}$ due to a fluid, required for keeping the plurality of heat-transfer tubes 6 in contact with the anti-vibration members 12 against the excitation force $F_{ex}$. Furthermore, the reaction force calculation model 71 is described by a spring constant model having unique spring constant k for each of the above-described degree-of-freedom directions, using the excitation force $F_{ex}$ as an external force and the reaction force $F_{rv}$ as a spring stress corresponding to the external force.

That is, in the time history response analysis using the reaction force calculation model 71 to obtain a contact force required for preventing the heat-transfer tube 6 from sliding with respect to the anti-vibration member 12 at a certain support point 15, it is assumed that the heat-transfer tube 6 is kept in a stop state without sliding vibration at the contact support point 15. As a result, the time history response analysis using the reaction force calculation model 71 demonstrates a transient behavior in which, upon the application of an excitation force, a portion other than the support point 15 shakes while the reaction force $F_{rv}$ acts in response to the excitation force at the fixed support point 15. Accordingly, with the time history response analysis using the reaction force calculation model 71, it is possible to evaluate necessary and sufficient contact force $F_{pin}$ for offsetting the reaction force $F_{rv}$, based on the reaction force $F_{rv}$ which acts in response to the excitation force at the support point 15.

Figure 8A:
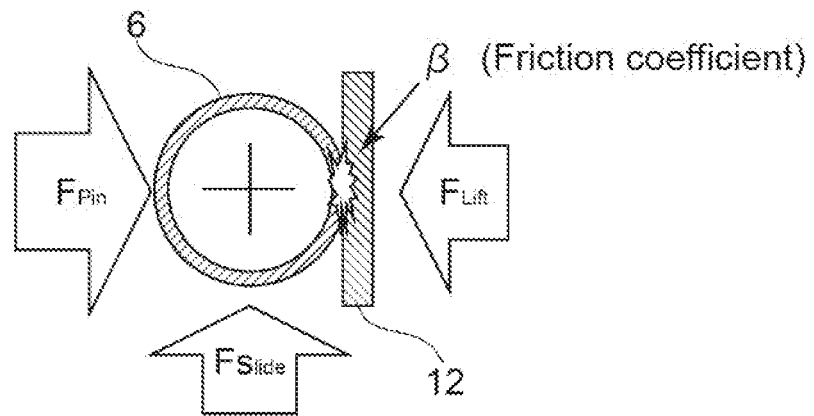
FIGS. 8A-8B are diagrams in which a reaction force acting on a heat-transfer tube from an anti-vibration member is resolved into perpendicular components.
Figure 8B:
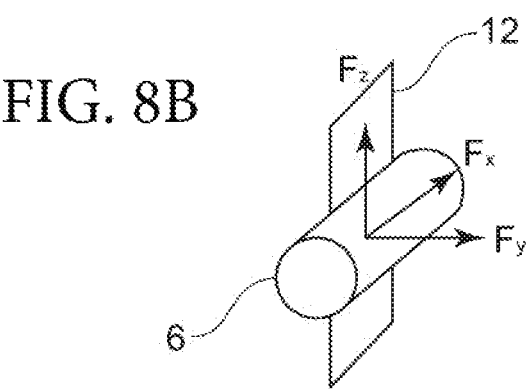

For instance, one or more degree-of-freedom directions of the excitation force $F_{ex}$ can be three degree-of-freedom directions Fx, Fy, and Fz including degree-of-freedom directions corresponding to a normal direction (y-axis direction) perpendicular to a contact surface between the heat-transfer tube 6 and the anti-vibration member 12 and two perpendicular tangential directions (x-axis direction and z-axis direction) along the contact surface (see FIG. 8(B)). In this case, the reaction force calculation model 71 can be described by spring constants kx, ky, and kz which are unique to the three degree-of-freedom directions Fx, Fy, and Fz, respectively. Here, it is assumed that the application of the excitation force $F_{ex}$ to the heat-transfer tube 6 as the external force causes the heat-transfer tube 6 to be shifted from the support point 15 along the three degree-of-freedom directions Fx, Fy, and Fz by displacement amounts Δx, Δy, and Δz. Under this assumption, the reaction force $F_{rv}$ required for keeping the heat-transfer tube 6 in contact with the anti-vibration member 12 against the excitation force $F_{ex}$ is calculated by Kx×Δx, ky×Δy, and kz×Δz along the three degree-of-freedom directions Fx, Fy, and Fz.

The probability density function calculation part 212 performs the time history response analysis using the excitation force $F_{ex}$ defined by the vibration time-sequential data Dt as the external force on the reaction force calculation model 71 thus constructed, thereby performing the time history response analysis on the vibration analysis model of the plurality of heat-transfer tubes 6 and the anti-vibration members 12. With this time history response analysis, it is possible to obtain results which simulate a random fluctuation of the value of the reaction force $F_{rv}$ received by the anti-vibration members 12 from the plurality of heat-transfer tube 6 as time history response. In this way, when the processing of step S508 is completed, the process proceeds to step S509.

In step 509, the probability density function calculation part 212 calculates average value $\mu_f$ and standard deviation $\sigma_f$ of the reaction force $F_{rv}$ received by the anti-vibration members 12 from the plurality of heat-transfer tubes 6 constituting the heat-transfer tube bundle 10, based on the time history response obtained by the time history response analysis. Specifically, the probability density function calculation part 212 calculates a frequency distribution (histogram) of the value of the reaction force $F_{rv}$ based on the random fluctuation of the value of the reaction force $F_{rv}$ obtained by the above-described time history response analysis. Next, the process proceeds to step S510, and the probability density function calculation part 212 calculates probability density function Pdf($F_{rv}$) which represents the population probability distribution of the reaction force received by the anti-vibration members 12 from the plurality of heat-transfer tube 6. Specifically, the probability density function calculation part 212 calculates the probability density function Pdf($F_{rv}$) of the reaction force $F_{rv}$ received by the anti-vibration member 12 from the heat-transfer tube 6 as a normal distribution defined by the average value $\mu_f$ of the reaction force $F_{rv}$ and the standard deviation $\sigma_f$ calculated in step S509.

In an exemplary embodiment, the probability density function Pdf($F_{rv}$) of the reaction force $F_{rv}$ is calculated by synthesizing first probability density function Pdf($F_{slide}$) corresponding to first reaction force $F_{slide}$ received by the anti-vibration member 12 in a tangential direction from a contact surface with the heat-transfer tube 6 constituting the heat-transfer tube bundle 10 and second probability density function Pdf($F_{lift}$) corresponding to second reaction force $F_{lift}$ received by the anti-vibration member 12 in a normal direction from the contact surface.

FIG. 8(A) illustrates that the reaction force $F_{rv}$ received by the anti-vibration member 12 from the heat-transfer tube 6 can be resolved into the first reaction force $F_{slide}$ which acts in a tangential direction from a contact surface between the heat-transfer tube 6 and the anti-vibration member 12 and the second reaction force $F_{lift}$ which acts in a normal direction from the contact surface. Additionally, FIG. 8(A) illustrates that the first reaction force $F_{slide}$ which acts along the contact surface between the heat-transfer tube 6 and the anti-vibration member 12 is characterized by friction coefficient β between the heat-transfer tube 6 and the anti-vibration member 12.

FIG. 8(B) shows a three-dimensional orthogonal coordinate system defined with the contact point between the heat-transfer tube 6 and the anti-vibration member 12 as the origin. Referring to FIG. 8(B), x-axis and y-axis in the three-dimensional orthogonal coordinate system extend along the contact surface between the heat-transfer tube 6 and the anti-vibration member 12. It is thus apparent from FIG. 8(B) that the first reaction force $F_{slide}$ which acts along the contact surface can be resolved into two components in degree-of-freedom directions corresponding to the x-axis direction and the y-axis direction in the three-dimensional orthogonal coordinate system. Additionally, referring to FIG. 8(B), y-axis in the three-dimensional orthogonal coordinate system is perpendicular to the contact surface between the heat-transfer tube 6 and the anti-vibration member 12, which indicates the second reaction force $F_{lift}$ corresponds to the degree-of-freedom direction component along the y-axis direction. This embodiment will now be described in more detail with reference to FIGS. 8 and 9.

As shown in FIG. 8, since the second reaction force $F_{lift}$ corresponds to a force vector perpendicular to the first reaction force $F_{slide}$, the probability distribution of the second reaction force $F_{lift}$ is obtained independently from the first reaction force $F_{slide}$. That is, in step S508, as a result of the time history response analysis performed by the probability density function calculation part 212, the probability density function Pdf($F_{lift}$) of the second reaction force $F_{lift}$ is obtained as a normal distribution independent from the probability density function Pdf($F_{slide}$) of the first reaction force $F_{slide}$.

On the other hand, the first reaction force $F_{slide}$ corresponds to a force vector obtained by synthesizing two degree-of-freedom direction components including the x-axis direction component and the z-axis direction component shown in FIG. 8(B). In this case, the x-axis direction component and the z-axis direction component of the first reaction force $F_{slide}$ are force vectors perpendicular to each other. In the population distribution, the x-axis direction component and the z-axis direction component are each distributed according to a normal distribution. Let Fx(t) be time-varying waveform of the x-axis direction component and Fz(t) be time-varying waveform of the z-axis direction component of the first reaction force $F_{slide}$, time-varying waveform $F_{slide}(t)$ of the first reaction force $F_{slide}$ is represented by the following expression.

(Expression 1)

$$F_{slide}(t) = \sqrt{F_x(t)^2 + F_y(t)^2}$$

Expression (1)

Figure 9A:
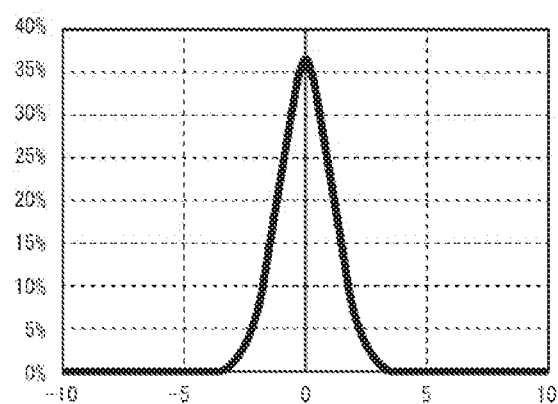
FIGS. 9A-9E are diagrams in which the probability distribution of a reaction force is obtained by synthesizing the probability distributions obtained for each perpendicular component constituting the reaction force.
Figure 9B:
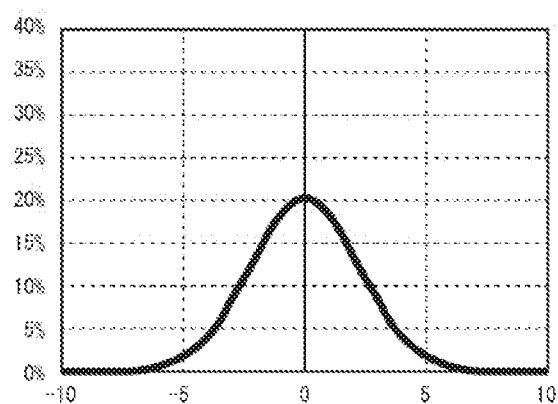
Figure 9C:
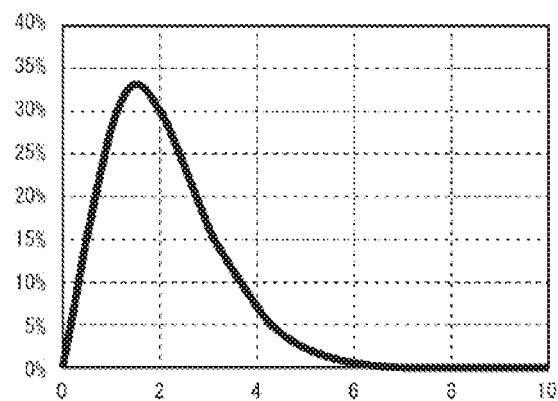

That is, in step S508, as a result of the time history response analysis performed by the probability density function calculation part 212, the probability density function Pdf($F_{slide}$) of the first reaction force $F_{slide}$ is obtained in form of a probability distribution in which two normal distributions are coupled. For instance, it is assumed that the population distribution of the x-axis direction component and the normal distribution of the z-axis direction component of the first reaction force $F_{slide}$ are obtained as shown in FIGS. 9(A) and 9(B), respectively. In this case, the probability density function Pdf($F_{slide}$) of the first reaction force $F_{slide}$ is obtained as a probability density function corresponding to the probability distribution shown in FIG. 9(C); the probability distribution shown in FIG. 9(C) is a probability distribution obtained by synthesizing the normal distribution shown in FIG. 9(A) and the normal distribution shown in FIG. 9(B).

From the above, the reaction force $F_{rv}$ received by the anti-vibration member 12 from the heat-transfer tube 6 is a force obtained by synthesizing the first reaction force $F_{slide}$ and the second reaction force $F_{lift}$. Therefore, synthesis of the probability density function Pdf($F_{slide}$) of the first reaction force $F_{slide}$ and the probability density function Pdf($F_{lift}$) of the second reaction force $F_{lift}$ provides the probability density function Pdf($F_{rv}$) of the reaction force $F_{rv}$. Here, the time-varying waveform $F_{rv}(t)$ of the reaction force $F_{rv}$ is calculated by synthesizing the time-varying waveform $F_{slide}(t)$ of the first reaction force and the time-varying waveform $F_{lift}(t)$ of the second reaction force according to the following expression.

(Expression 2)

$$F_{rv}(t) = F_{lift}(t) + \frac{F_{slide}(t)}{\beta} \qquad \text{Expression (2)}$$

In the expression 2, $\beta$ represents a friction coefficient when friction is caused between the heat-transfer tube 6 and the anti-vibration member 12.

Thus, the probability density function Pdf($F_{rv}$) is obtained by convolution of the probability density function Pdf($F_{lift}$) of the second reaction force and the probability density function Pdf($F_{slide}$) of the first reaction force according to the following expression.

(Expression 3)

$$Pdf(F_{rv}) = P_{rv}(b) = \int_0^\infty P_{slide/\beta}(r) \times P_{lift}(b-r)dr \qquad \text{Expression (3)}$$

In the expression 3, $P_{rv}(b)$ is a function which represents the probability density function Pdf($F_{rv}$), receives input parameter b, and outputs a probability that the value of the reaction force $F_{rv}$ received by the anti-vibration member 12 from the heat-transfer tube 6 is equal to b. $P_{slide/\beta}(r)$ is a function which represents the probability density function Pdf($F_{slide}$) of the first reaction force, receives input parameter r, and outputs a probability that a value obtained by dividing the value of the first reaction force $F_{slide}$ by the friction coefficient $\beta$ is equal to r. $P_{lift}(b-r)$ is a function which represents the probability density function Pdf($F_{lift}$) of the second reaction force, receives input parameter b−r, and outputs a probability that the value of the second reaction force $F_{lift}$ is equal to b−r.

Figure 9D:
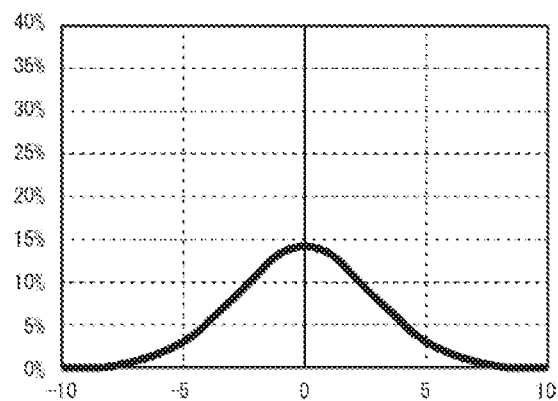
Figure 9E:
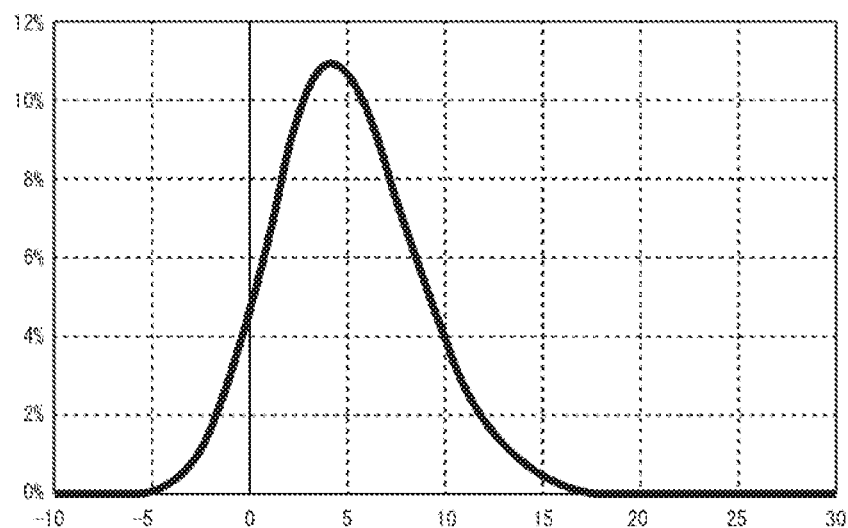

It is here assumed that the probability density function Pdf($F_{lift}$) of the second reaction force represented by $P_{lift}(b-r)$ is represented by the normal distribution shown in FIG. 9(D). In this case, since the probability density function Pdf($F_{slide}$) of the first reaction force represented by $P_{slide/\beta}(r)$ corresponds to the probability distribution shown in FIG. 9(C), the probability density function Pdf($F_{rv}$) of the reaction force $F_{rv}$ is obtained, as shown in FIG. 9(E), as a curve in which the normal distribution shown in FIG. 9(D) and the probability distribution shown in FIG. 9(C) are synthesized.

By the above processing, the probability density function calculation part 212 calculates the probability density function Pdf($F_{rv}$) of the reaction force received by the anti-vibration members 12 from the plurality of heat-transfer tubes 6 constituting the heat-transfer tube bundle 10 in response to a predetermined input, using the vibration analysis model (reaction force calculation model 71 in FIG. 7) of the anti-vibration members 12 and the heat-transfer tubes 6. That is, the probability density function calculation part 212 applies the vibration time-sequential data Dt received from the input unit 24 to the above-described reaction force calculation model 71 to perform the time history response analysis. Finally, the probability density function calculation part 212 calculates the probability density function Pdf($F_{rv}$) of the reaction force received by the anti-vibration member 12 from the heat-transfer tube 6 and passes it to the probability calculation part 213. When the processing of step S510 is completed, the probability density function calculation part 212 transfers execution control to the probability calculation part 213, and the probability calculation part 213 starts to perform step S511.

In step S511, the probability calculation part 213 first receives the contact force value $F_0$, which the contact force setting part 211 set in step S501, from the contact force setting part 211. Then, the probability calculation part 213 calculates probability Pr($F_{rv} \geq F_0$) that the reaction force $F_{rv}$ is equal to or higher than the contact force value $F_0$ set by the contact force setting part 211, based on the probability density function Pdf($F_{rv}$) calculated as the probability distribution of the reaction force $F_{rv}$ received by the anti-vibration members 12 from the plurality of heat-transfer tubes 6. That is, the probability calculation part 213 calculates a cumulative probability that the reaction force $F_{rv}$ which can occur between the plurality of heat-transfer tubes 6 and the anti-vibration members 12 exceeds the contact force $F_0$ set by the contact force setting part 211, in the probability density function Pdf($F_{rv}$) calculated as the probability distribution of the reaction force $F_{rv}$.

Figure 10:
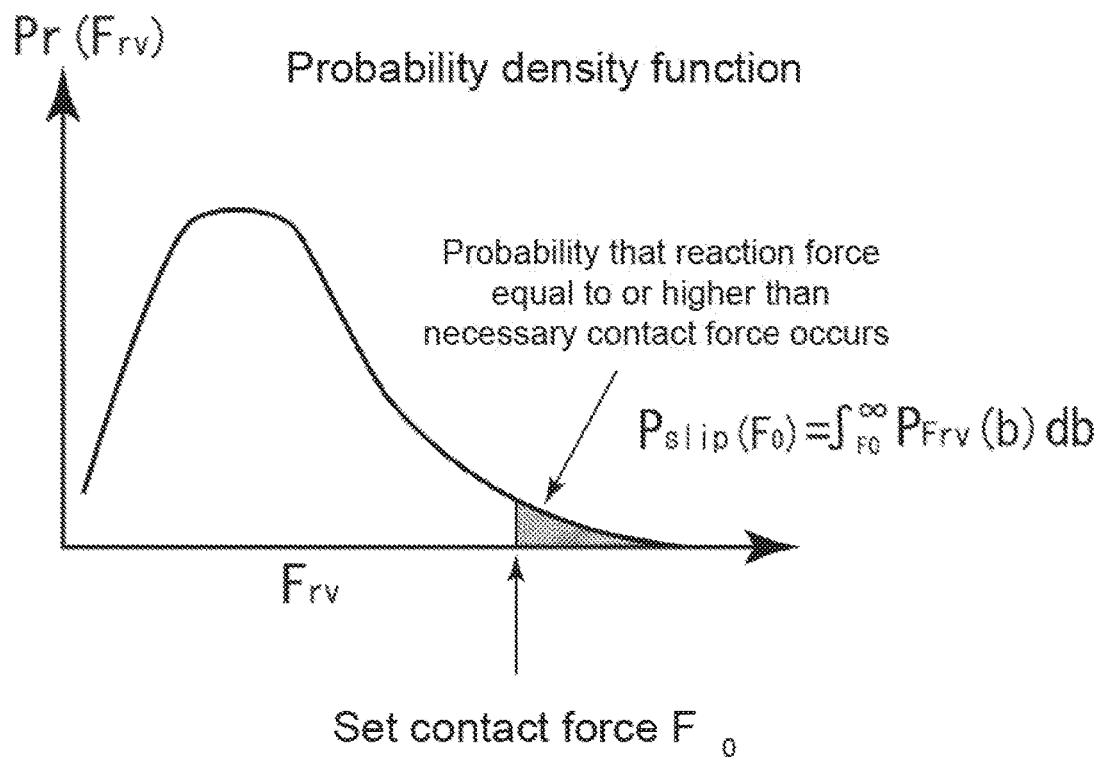
FIG. 10 is a diagram in which a probability that a reaction force exceeds a contact force set value is obtained by using a probability density function of the reaction force.

More specifically, as shown in FIG. 10, the probability calculation part 213 calculates a cumulative probability Pr($F_{rv} \geq F_0$) that the reaction force $F_{rv}$ which can occur between the plurality of heat-transfer tubes 6 and the anti-vibration members 12 is equal to or higher than the set contact force $F_0$ set by the contact force setting part 211, based on a relationship between the contact force $F_0$ and the probability density function Pdf($F_{rv}$). If the reaction force $F_{rv}$ which can occur between the plurality of heat-transfer tubes 6 and the anti-vibration members 12 is equal to or higher than the set contact force $F_0$ set by the contact force setting part 211, friction is caused by sliding between the heat-transfer tube 6 and the anti-vibration member 12 at a contact surface between the heat-transfer tube 6 and the anti-vibration member 12. Thus, the probability Pr($F_{rv} \geq F_0$) that the reaction force $F_{rv}$ which can occur between the heat-transfer tube 6 and the anti-vibration member 12 is equal to or higher than the set contact force $F_0$ set by the contact force setting part 211 corresponds to a probability that friction is caused by sliding between the heat-transfer tube 6 and the anti-vibration member 12 during the period of operating an apparatus including the heat-transfer tube bundle 10.

Hereinafter, a specific method for calculating the cumulative probability that the reaction force $F_{rv}$ which can occur between the plurality of heat-transfer tubes 6 and the anti-vibration members 12 exceeds the contact force $F_0$ set by the contact force setting part 211 will be described with reference to FIG. 10. In FIG. 10, the probability density function $Pdf(F_{rv})$ of the reaction force $F_{rv}$ is represented by function $P_{rv}(b)$ which receives input parameter b and outputs a probability that the value of the reaction force $F_{rv}$ is equal to b. FIG. 10 indicates that a probability that the reaction force $F_{rv}$ between the heat-transfer tube 6 and the anti-vibration member 12 is equal to or higher than the set contact force $F_0$ is identical to a cumulative probability corresponding to an area (shaded area shown in FIG. 10) obtained by definite integration of the curve of the function $P_{rv}(b)$ along the horizontal axis from the set contact force $F_0$ to infinity $\infty$. That is, the probability $Pr(F_{rv} \geq F_0)$ that the reaction force $F_{rv}$ between the heat-transfer tube 6 and the anti-vibration member 12 is equal to or higher than the set contact force $F_0$ is calculated by the following expression.

(Expression 4)

$$Pr(F_{rv} \geq F_0) = P_{slip}(F_0) = \int_{F_0}^{\infty} P_{rv}(b)db \qquad \text{Expression (4)}$$

When the probability $Pr(F_{rv} \geq F_0)$ that the reaction force $F_{rv}$ which can occur between the heat-transfer tube 6 and the anti-vibration member 12 is equal to or higher than the contact force $F_0$ set by the contact force setting part 211 is calculated as described above, the processing of step S511 is completed, and the process proceeds to step S512.

In step S512, the probability calculation part 213 outputs the value of the probability $Pr(F_{rv} \geq F_0)$ calculated in step S511 to the contact force evaluation part 215. Further, the contact force evaluation part 215 receives the vibration time-sequential data Dt from the probability density function calculation part 212 via the probability calculation part 213. In step S512, the contact force evaluation part 215 which receives the value of the probability $Pr(F_{rv} \geq F_0)$ estimates a slippage occurrence time $T_{slip}$ during a predetermined period, based on the value of the probability $Pr(F_{rv} \geq F_0)$. Specifically, the contact force evaluation part 215 multiplies the length of an operation period of an apparatus including the heat-transfer tube bundle 10 by the value of the probability $Pr(F_{rv} \geq F_0)$ to calculate the slippage occurrence time $T_{slip}$ which is the total time during which friction occurs due to sliding between the heat-transfer tube 6 and the anti-vibration member 12 during the operation period.

Then, the processing of step S502 to step S507 successively performed by the contact force evaluation part 215 will be described with the flow chart of FIG. 6. First, in step S502, the contact force evaluation part 215 constructs a vibration analysis model of the plurality of heat-transfer tubes 6 and the anti-vibration members 12 as a wear amount calculation model shown in FIG. 7. Then, the contact force evaluation part 215 performs a time history response analysis on the wear amount calculation model 72 using the vibration time-sequential data Dt, thereby obtaining time history response.

The wear amount calculation model 72 is a model simulating a system in which the plurality of heat-transfer tubes 6 arranged in the same plane in the heat-transfer tube bundle 10 receives a contact force equivalent to the contact force $F_0$ from the anti-vibration members 12 extending along this plane, at a contact surface where the plurality of heat-transfer tubes 6 is in sliding contact with the anti-vibration members 12. In the wear amount calculation model 72, when the excitation force $F_{ex}$ defined by the vibration time-sequential data Dt is used as the external force, a force received by the heat-transfer tube 6 from the anti-vibration member 12 is modeled as a bending stress which occurs in the heat-transfer tube 6 and the anti-vibration member 12 in accordance with the interference displacement amount between the heat-transfer tube 6 and the anti-vibration member 12.

The contact force evaluation part 215 performs the time history response analysis using the excitation force $F_{ex}$ defined by the vibration time-sequential data Dt as the external force on the wear amount calculation model 72 thus constructed, thereby performing the time history response analysis on the vibration analysis model of the plurality of heat-transfer tubes 6 and the anti-vibration members 12. In this way, when the processing of step S502 is completed, the process proceeds to step S503.

In step S503, the contact force evaluation part 215 calls and executes the wear amount estimation part 214. Then, the wear amount estimation part 214 calculates power (work rate) wr by using the amount of work which occurs when small displacement is caused, due to the set contact force $F_0$, between the anti-vibration member 12 and the heat-transfer tube 6 of the heat-transfer tube bundle 10, based on the time history response. Then, the process proceeds to step S504, and the wear amount estimation part 214 multiplies the power wr by the specific wear rate and the slippage occurrence time $T_{slip}$ to estimate the amount of wear (wear volume) which occurs when the heat-transfer tube 6 and the anti-vibration member 12 cause friction. The value of the specific wear rate is a rate between the power and the wear amount per unit time which is previously experimentally obtained. Thus, the wear amount estimation part 214 evaluates energy consumption per unit time due to friction by using the power (energy dissipation rate) when the wear amount due to friction between the heat-transfer tube 6 and the anti-vibration member 12 is calculated. Then, the process proceeds to step S505, and the wear amount estimation part 214 calculates wear depth h along the depth direction of the contact surface between the heat-transfer tube 6 and the anti-vibration member 12, in accordance with the wear amount calculated in step S504.

Then, the process proceeds to step S506, and the wear amount estimation part 214 returns execution control to the contact force evaluation part 215. In step S506, the contact force evaluation part 215 estimates a decrease in contact force which acts between the heat-transfer tube 6 and the anti-vibration member 12, based on the wear depth h calculated in step S505 and equivalent stiffness K of the heat-transfer tube bundle 10. In an example, the equivalent stiffness K of the heat-transfer tube bundle 10 used for estimating the decrease $\Delta F$ in contact force in step S506 may be a value calculated with the contact force evaluation part 215 by applying the finite-element method to the heat-transfer tube bundle 10 in step S513.

Then, the process proceeds to step S507, and the contact force evaluation part 215 judges whether contact force $F_0 - \Delta F$ obtained by lowering the contact force $F_0$ set in step S501 by the decrease $\Delta F$ in contact force estimated in step S506 exceeds a predetermined evaluation criterion. For instance, the contact force evaluation part 215 judges whether the decrease in contact force $F_0$ is equal to or lower than a predetermined threshold to evaluate the set contact force $F_0$, based on results of evaluation. In this way, the contact force evaluation part 215 calls the wear amount estimation part 214 to estimate the wear amount which occurs between the anti-vibration member 12 and the heat-transfer tube 6 constituting the heat-transfer tube bundle 10 during a predetermined period, based on the value of the probability $Pr(F_{rv} \geq F_0)$, consequently evaluating the set contact force $F_0$, based on the estimated wear amount.

In step S507, if it is judged that the contact force $F_0 - \Delta F$ exceeds the predetermined evaluation criterion (threshold), the contact force evaluation part 215 determines that the contact force $F_0$ is sufficient as the contact force $F_{pin}$ which acts between the heat-transfer tube 6 and the anti-vibration member 12 in order to suppress the self-excited vibration of the heat-transfer tube bundle 10. Then, the contact force evaluation part 215 outputs the contact force $F_0$ to the output unit 23 as the contact force $F_{pin}$ which needs to be applied between the heat-transfer tube 6 and the anti-vibration member 12, then completing the execution of the flow chart in FIG. 6.

Conversely, if it is judged that the contact force $F_0 - \Delta F$ is equal to or lower than the predetermined evaluation criterion (threshold), the contact force evaluation part 215 determines that the contact force $F_0$ is insufficient as the contact force $F_{pin}$ which acts between the heat-transfer tube 6 and the anti-vibration member 12 in order to suppress the self-excited vibration of the heat-transfer tube bundle 10. Then, the contact force evaluation part 215 increases the value of the contact force $F_0$ by a predetermined increase and returns execution control to the contact force setting part 211. As a result, the execution of the flow chart of FIG. 6 returns to step S501, and the contact force setting part 211 sets a new set value, contact force $F_0'$, obtained by increasing the contact force $F_0$ by the predetermined increase. Then, the processing of step S502 to step S507 is performed again, based on the new set value $F_0'$ in the flow chart of FIG. 6.

As described above, in the embodiment described with reference to FIGS. 5 to 9, the probability density function $Pdf(F_{rv})$ of the reaction force $F_{rv}$ received by the anti-vibration member 12 from the heat-transfer tube 6 is calculated using the vibration analysis model of the anti-vibration member 12 and the heat-transfer tube 6 constituting the heat-transfer tube bundle 10; the probability $Pr(F_{rv} \geq F_0)$ that the reaction force $F_{rv}$ is equal to or higher than the set contact force $F_0$ is obtained based on the probability density function $Pdf(F_{rv})$; and the set contact force $F_0$ is evaluated based on the probability $Pr(F_{rv} \geq F_0)$. Thus, in this embodiment, even if the reaction force $F_{rv}$ received by the anti-vibration member 12 from the heat-transfer tube 6 constituting the heat-transfer tube bundle 10 randomly varies over time, it is possible to quantitatively judge whether the contact force $F_0$ is sufficient or not, based on the probability $Pr(F_{rv} \geq F_0)$ that the reaction force $F_{rv}$ is equal to or higher than the set contact force $F_0$. As a result, in this embodiment, it is possible to appropriately estimate to what extent is a contact force required for preventing each heat-transfer tube 6, constituting the tube bundle supported by friction with the anti-vibration member 12 in a fluid, from causing the self-excited vibration due to an excitation force of the fluid.

Additionally, in this embodiment, the wear amount which occurs between the heat-transfer tube 6 and the anti-vibration member 12 during a predetermined period is estimated based on the probability that the reaction force acting on the anti-vibration member 12 from the heat-transfer tube 6 constituting the heat-transfer tube bundle 10 is equal to or higher than the set contact force, and the set contact force $F_0$ is evaluated based on the estimated wear amount. As a result, even if the contact force $F_0$ acting between the heat-transfer tube 6 and the anti-vibration member 12 decreases in accordance with the wear amount which occurs between the anti-vibration member 12 and the heat-transfer tube 6 constituting the heat-transfer tube bundle 10, it is possible to evaluate the set contact force $F_0$ taking into consideration the decrease in contact force $F_0$.

Additionally, in this embodiment, the wear amount per unit time which occurs between the anti-vibration member 12 and the heat-transfer tube 6 constituting the heat-transfer tube bundle 10 is obtained as the power wr calculated from the amount of work which occurs when small displacement is caused between the heat-transfer tube 6 and the anti-vibration member 12 due to the contact force $F_0$. Thus, in this embodiment, it is possible to quantify the wear amount per unit time as the power wr obtained from the amount of work which occurs when small displacement is caused between the heat-transfer tube 6 and the anti-vibration member 12 due to the contact force $F_0$, without describing contact characteristics and friction characteristics between the heat-transfer tube 6 and the anti-vibration member 12 by a complicated dynamical system model. As a result, in this embodiment, it is possible to calculate the wear amount per unit time which occurs between the heat-transfer tube 6 and the anti-vibration member 12, with simple arithmetic in a short time.

Additionally, in this embodiment, drawing attention to the fact that sliding friction occurs between the heat-transfer tube 6 and the anti-vibration member 12 when the reaction force $F_{rv}$ acting on the anti-vibration member 12 from the heat-transfer tube 6 is equal to or higher than the set contact force $F_0$, the wear amount which occurs between the heat-transfer tube 6 and the anti-vibration member 12 is estimated in accordance with the occurrence time of the sliding friction. In this context, in this embodiment, the occurrence time of the sliding friction is calculated based on a relationship between the probability density function $Pdf(F_{rv})$ of the reaction force $F_{rv}$ obtained through the time history response analysis on the vibration analysis model and the set contact force $F_0$. Thus, in this embodiment, it is unnecessary to actually measure the wear amount which occurs between the heat-transfer tube 6 and the anti-vibration member 12 during a predetermined period as well as the length of the time during which the sliding friction occurs between the heat-transfer tube 6 and the anti-vibration member 12 by experimental approach, and it is possible to obtain these values by analytical calculation.

Additionally, in this embodiment, the equivalent stiffness K of the heat-transfer tube bundle 10 is calculated; a decrease in contact force $F_0$ is calculated based on the wear amount due to sliding friction between the anti-vibration member 12 and the heat-transfer tube 6 constituting the heat-transfer tube bundle 10 and the equivalent stiffness K; and the set contact force $F_0$ is evaluated based on the judgment whether the decrease in contact force $F_0$ is equal to or lower than a threshold. Thus, in this embodiment, it is possible to calculate the decrease in contact force $F_0$ based on the wear amount and the equivalent stiffness K by previously obtaining the equivalent stiffness K of the entire heat-transfer tube bundle 10. Consequently, in this embodiment, after the wear amount is analytically calculated as described above, it is possible to calculate the decrease in contact force $F_0$ with simple arithmetic in a short time, using the value of the previously calculated equivalent stiffness K.

Further, as described above with reference to FIG. 8, in some embodiments, the reaction force $F_{rv}$ received by the anti-vibration member 12 from the heat-transfer tube 6 of the heat-transfer tube bundle 10 is resolved into the first reaction force $F_{slide}$ which acts in a tangential direction from the contact surface between the heat-transfer tube 6 and the anti-vibration member 12 and the second reaction force $F_{lift}$ which acts in a normal direction from the contact surface so as to be resolved into perpendicular components. In addition, in the embodiment shown in FIG. 8, two probability density functions $\text{Pdf}(F_{slide})$ and $\text{Pdf}(F_{lift})$ respectively obtained for the first reaction force $F_{slide}$ and the second reaction force $F_{lift}$ are synthesized to obtain the probability density function $\text{Pdf}(F_{rv})$ of the reaction force $F_{rv}$. Thus, in this embodiment, even if the direction of action and the magnitude of the reaction force $F_{rv}$ received by the anti-vibration member 12 from the heat-transfer tube 6 irregularly vary over the entire heat-transfer tube bundle 10, resolving the reaction force $F_{rv}$ into two perpendicular components allows simplification of the construction of the vibration analysis model as well as the calculation of the probability density function.

Further, as described above with reference to FIG. 9, in some embodiments, the average value $\mu_f$ and the standard deviation $\sigma_f$ of the reaction force $F_{rv}$ received by the anti-vibration member 12 from the heat-transfer tube 6 constituting the heat-transfer tube bundle 10 are calculated based on the time history response obtained by the time history response analysis on the vibration analysis model using a predetermined input, and the probability density function $\text{Pdf}(F_{rv})$ is calculated as the normal distribution defined by the average value $\mu_f$ and the standard deviation $\sigma_f$. As a result, in the embodiment described above with reference to FIG. 9, it is possible to more precisely estimate the necessary contact force required to suppress the self-excited vibration according to actual situation, for the following reasons.

That is, the time history response obtained by the time history response analysis on the vibration analysis model reflects a time-dependent variation of the reaction force $F_{rv}$ which appears only during a period of performing the time history response analysis but does not reflect a time-dependent variation of the reaction force $F_{rv}$ over the entire operation period of an apparatus including the plurality of heat-transfer tubes 6 and the anti-vibration members 12. On the other hand, if the reaction force $F_{rv}$ randomly varies over time, it is considered that the probability distribution of the reaction force $F_{rv}$ over the entire operation period of the apparatus (e.g., steam generator) including the plurality of heat-transfer tubes 6 and the anti-vibration members 12 can be approximated by the normal distribution. In view of this, in the embodiment described above with reference to FIG. 9, the normal distribution defined by the average value $\mu_f$ and the standard deviation $\sigma_f$ of the reaction force $F_{rv}$ obtained based on the time history response is used as the probability density function $\text{Pdf}(F_{rv})$ used for estimating the probability $\text{Pr}(F_{rv} \geq F_0)$ that the reaction force $F_{rv}$ is equal to or higher than the set contact force $F_0$. That is, in this embodiment, since the normal distribution is used as the probability density function $\text{Pdf}(F_{rv})$ of the reaction force, it is possible to obtain the probability that the reaction force $F_{rv}$ is equal to or higher than the set contact force $F_0$, taking into consideration the time-dependent variation of the reaction force $F_{rv}$ over the entire operation period of an apparatus including the plurality of heat-transfer tubes 6 and the anti-vibration members 12.

REFERENCE SIGNS LIST

3 Heat-transfer tube
4 First straight tube part
5 Second straight tube part
6 (6a1, 6a2, 6a3, 6b1, 6c1) Bent part
7 Tube support plate
8 Tube array
10 Heat-transfer tube bundle
10a Bent portion
11 First retention member
12a End part
12, 12k, 12m Anti-vibration member
14 Second retention member
20 Computer device
21 Computing unit
22 Storage unit
22a Program
22b Data
23 Output unit
24 Input unit
71 Reaction force calculation model
72 Wear amount calculation model
211 Contact force setting part
212 Probability density function calculation part
213 Probability calculation part
214 Wear amount estimation part
215 Contact force evaluation part
D1 Out-of-plane direction
D2 In-plane direction
Dt Vibration time-sequential data
F0 Set contact force
Fpin Necessary contact force
Fex Excitation force
Frv Reaction force
Fslide First reaction force
Flift Second reaction force
G Flow direction
K Equivalent stiffness
d1, d2 Array direction

The invention claimed is:

1. A contact force evaluation method for evaluating a contact force against a supporting member of a tube bundle positioned in a fluid and supported by the supporting member, the method comprising:
a contact force setting step of setting a contact force of the tube bundle;
a probability density function calculation step of calculating a probability density function of a reaction force received by the supporting member from the tube bundle in response to a predetermined input, using a vibration analysis model of the tube bundle and the supporting member;
a probability calculation step of calculating a probability that a reaction force equal to or higher than the set contact force occurs, based on the calculated probability density function; and
an evaluation step of evaluating the set contact force, based on the calculated probability,
wherein the tube bundle includes at least one tube array extending in same plane,
wherein the supporting member includes at least a pair of anti-vibration members disposed on both sides of the tube array and extending along the plane so that the tube array is interposed therebetween, and
wherein evaluation is performed for a contact load force which needs to be applied between the anti-vibration members and the tube array so as to suppress self-excited vibration of the tube bundle, which is supported by friction with the anti-vibration members, in a direction along the plane, against an excitation force of the fluid flowing through the tube bundle.

2. The contact force evaluation method according to claim 1,
wherein the probability density function calculation step includes: performing a time history response analysis on the vibration analysis model using the predetermined input to obtain a time history response; calculating an average value and a standard deviation of the reaction force, based on the time history response; and calculating the probability density function as a normal distribution defined by the average value and the standard deviation.

3. The contact force evaluation method according to claim 1,
wherein the probability density function is calculated by synthesizing a first probability density function and a second probability density function, the first probability density function corresponding to a first reaction force received by the supporting member in a tangential direction from a contact surface between the supporting member and the tube bundle, the second probability density function corresponding to a second reaction force received by the supporting member in a normal direction from the contact surface.

4. The contact force evaluation method according to claim 1,
wherein the evaluation step including: estimating a wear amount which occurs between the tube bundle and the supporting member during a predetermined period, based on the calculated probability; and evaluating the set contact force, based on the estimated wear amount.

5. The contact force evaluation method according to claim 4, further comprising a power calculation step of calculating a power based on a work amount which occurs when a minute displacement is caused between the tube bundle and the supporting member due to the set contact force,
wherein the evaluating step includes: estimating a slippage occurrence time caused during the predetermined period, based on the probability; and multiplying the power by the slippage occurrence time to estimate the wear amount.

6. The contact force evaluation method according to claim 4, further comprising an equivalent stiffness calculation step of calculating an equivalent stiffness of the tube bundle,
wherein the evaluating step includes; calculating a decrease in the contact force, based on the wear amount and the equivalent stiffness; and evaluating the set contact force, based on whether the calculated decrease is equal to or lower than a threshold.

7. The contact force evaluation method according to claim 6,
wherein the equivalent stiffness calculation step includes applying a finite-element method to the tube bundle to calculate the equivalent stiffness.

8. The contact force evaluation method according to claim 1,
wherein the at least one tube array is composed of a plurality of U-shaped tubes, the U-shaped tubes extending in same plane, having a common curvature center, and having bent parts with different curvature radii from each other.

9. The contact force evaluation method according to claim 1,
wherein the tube bundle is a heat-transfer tube bundle of a steam generator of a PWR nuclear power generating plant.

* * * * *